(12) United States Patent
Kompella

(10) Patent No.: US 9,100,281 B2
(45) Date of Patent: Aug. 4, 2015

(54) SYSTEMS AND METHODS FOR EQUAL-COST MULTI-PATH VIRTUAL PRIVATE LAN SERVICE

(71) Applicant: Kireeti Kompella, Los Altos, CA (US)

(72) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 181 days.

(21) Appl. No.: 13/857,517

(22) Filed: Apr. 5, 2013

(65) Prior Publication Data

US 2013/0223283 A1 Aug. 29, 2013

Related U.S. Application Data

(63) Continuation of application No. 12/782,990, filed on May 19, 2010, now Pat. No. 8,416,775.

(51) Int. Cl.
| | | |
|---|---|---|
| H04L 12/28 | (2006.01) |
| H04L 12/751 | (2013.01) |
| H04L 12/705 | (2013.01) |
| H04L 12/709 | (2013.01) |
| H04L 12/721 | (2013.01) |
| H04L 12/18 | (2006.01) |
| H04L 29/12 | (2006.01) |

(52) U.S. Cl.
CPC ............... *H04L 45/02* (2013.01); *H04L 45/18* (2013.01); *H04L 45/245* (2013.01); *H04L 45/68* (2013.01); *H04L 12/184* (2013.01); *H04L 12/185* (2013.01); *H04L 29/12952* (2013.01); *Y02B 60/33* (2013.01)

(58) Field of Classification Search
CPC ..... H04L 12/184; H04L 12/185; H04L 47/15; H04L 29/12952; H04L 61/6077
See application file for complete search history.

(56) References Cited

U.S. PATENT DOCUMENTS

| | | |
|---|---|---|
| 6,662,308 B1 | 12/2003 | Baroni et al. |
| 6,873,627 B1 * | 3/2005 | Miller et al. ................ 370/466 |
| 7,023,797 B2 | 4/2006 | Tagore-Brage |
| 7,136,374 B1 | 11/2006 | Kompella |
| 7,152,115 B2 | 12/2006 | Ould Brahim et al. |
| 7,263,099 B1 * | 8/2007 | Woo et al. ..................... 370/390 |
| 7,382,781 B1 | 6/2008 | Sridhar et al. |
| 7,408,941 B2 | 8/2008 | Martini et al. |
| 7,420,972 B1 * | 9/2008 | Woo et al. ..................... 370/390 |
| 7,505,402 B2 | 3/2009 | Filsfils et al. |
| 7,522,599 B1 | 4/2009 | Aggarwal et al. |
| 7,596,629 B2 | 9/2009 | Luo |
| 7,650,637 B2 | 1/2010 | Li et al. |
| 7,707,277 B2 | 4/2010 | Lange et al. |
| 7,733,876 B2 | 6/2010 | Davie et al. |
| 7,773,611 B2 | 8/2010 | Booth et al. |
| 7,774,500 B1 | 8/2010 | D'Souza et al. |

(Continued)

*Primary Examiner* — Brian O'Connor
(74) *Attorney, Agent, or Firm* — Harrity & Harrity, LLP

(57) ABSTRACT

A provider edge device, associated with a virtual private local area network service (VPLS) system, includes a memory to store instructions to implement a pseudowire mechanism to receive a first data frame from a source customer edge (CE) device associated with the VPLS system, incorporate the first data frame into a first VPLS packet, determine whether the source CE device is a single-homed CE device or a multi-homed CE device, and incorporate, into the first VPLS packet, a first pseudowire label, if the source CE device is a single-homed CE device, and incorporate, into the first VPLS packet, a second pseudowire label, different from the first pseudowire label, if the source CE device is a multi-homed CE device; and a processor to execute the instructions.

20 Claims, 12 Drawing Sheets

(56) References Cited

U.S. PATENT DOCUMENTS

| | | |
|---|---|---|
| 7,804,779 B2 | 9/2010 | Grenot et al. |
| 7,864,769 B1 * | 1/2011 | Woo et al. ............... 370/390 |
| 7,929,528 B2 | 4/2011 | Henry et al. |
| 7,969,981 B2 | 6/2011 | Asati et al. |
| 8,018,900 B2 | 9/2011 | Blanchette et al. |
| 8,077,709 B2 | 12/2011 | Cai et al. |
| 8,081,629 B2 * | 12/2011 | Miller et al. ............. 370/390 |
| 8,116,760 B2 | 2/2012 | Gu |
| 8,179,900 B2 * | 5/2012 | Kitada ................. 370/395.53 |
| 8,259,563 B1 * | 9/2012 | Kothari et al. ............ 370/225 |
| 8,270,395 B2 | 9/2012 | Kompella |
| 8,284,656 B2 | 10/2012 | Saha et al. |
| 8,306,048 B2 | 11/2012 | Napierala |
| 2004/0258069 A1 | 12/2004 | Serbest et al. |
| 2007/0076709 A1 * | 4/2007 | Mattson et al. ............ 370/389 |
| 2007/0253326 A1 | 11/2007 | Saha et al. |
| 2008/0112323 A1 | 5/2008 | Agmon et al. |
| 2008/0250492 A1 | 10/2008 | Hazard |
| 2009/0154339 A1 | 6/2009 | Zi |
| 2009/0296568 A1 | 12/2009 | Kitada |
| 2010/0128728 A1 | 5/2010 | Sun et al. |
| 2010/0284413 A1 | 11/2010 | Abdullah et al. |
| 2011/0286462 A1 | 11/2011 | Kompella |

* cited by examiner

PSEUDOWIRE TABLE 415

| VPLS IDENTIFIER 505 |||
|---|---|---|
| PSEUDOWIRE LABEL 510 | SITE NUMBER 520 | NEIGHBOR 525 |
| ● | ● | ● |
| ● | ● | ● |
| ● | ● | ● |

FIG. 5A

MAC TABLE 425

| VPLS IDENTIFIER 505 ||
|---|---|
| MAC ADDRESS 530 | SITE NUMBER/ CE DEVICE 540 |
| ● | ● |
| ● | ● |
| ● | ● |

FIG. 5B

LAG TABLE 435

| VPLS IDENTIFIER 505 ||||
|---|---|---|---|
| SITE NUMBER 550 | PSEUDO-WIRE 560a | ● ● ● | PSEUDO-WIRE 560n |
| ● | ● | | ● |
| ● | ● | | ● |
| ● | ● | | ● |

FIG. 5C

SYSTEMS AND METHODS FOR EQUAL-COST MULTI-PATH VIRTUAL PRIVATE LAN SERVICE

RELATED APPLICATION

This application is a continuation of U.S. patent application Ser. No. 12/782,990, filed May 19, 2010, the disclosure of which is incorporated herein by reference.

BACKGROUND

A local area network (LAN) may include a computer network covering a small physical area that may connect electronic devices, such as computers, printers, switches, routers, telephones, firewalls, or other electronic devices. A LAN may communicate using Ethernet technology and may provide high data transfer rates, the ability to share peripheral devices, increased security, and sharing of data and applications from a central location. A customer may operate two or more LANs that are physically remote and may desire to combine the remote LANs into a single network. A network service provider may provide a virtual private LAN service (VPLS) over a network (e.g. the Internet), which may emulate a point-to-point LAN connection over the network, allowing the physically remote LANs to behave as if part of a single Ethernet domain. As customers continue to request additional functionality, a VPLS provider may find it increasingly challenging to meet such demands.

SUMMARY OF THE INVENTION

According to one aspect, a provider edge (PE) device, associated with a virtual private local area service (VPLS) system, may include a memory to store instructions to implement a pseudowire mechanism to receive a first data frame from a source customer edge (CE) device associated with the VPLS system, incorporate the first data frame into a first VPLS packet, determine whether the source CE device is a single-homed CE device or a multi-homed CE device, and incorporate, into the first VPLS packet, a first pseudowire label, if the source CE device is a single-homed CE device, and incorporate, into the first VPLS packet, a second pseudowire label, different from the first pseudowire label, if the source CE device is a multi-homed CE device; and a processor to execute the instructions.

According to another aspect, a method performed by a first provider edge device, may include receiving, by a port of the PE device, a first data frame from a first CE device; determining, by a control unit of the PE device, whether the first CE device corresponds to a multi-homed CE device or a single-homed CE device; adding, by the control unit, a first pseudowire label to a VPLS packet that includes the first data frame, when the CE device corresponds to a first single-homed CE device; and adding, by the control unit, a second pseudowire label, different from the first pseudowire label, to the VPLS packet that includes the first data frame, when the CE device corresponds to a first multi-homed CE device.

According to yet another aspect, a VPLS system may include a plurality of PE devices, where a first PE device is to receive data frames, incorporate the data frames into VPLS packets, and send the VPLS packets to a second PE device via pseudowires, where the first PE device associates a distinct pseudowire with a particular CE device, connected to the first PE device, if the particular CE device includes a connection to another PE device associated with the VPLS system, and where the first PE device associates a same pseudowire for CE devices that do not include a connection to another PE device.

BRIEF DESCRIPTION OF THE DRAWINGS

The accompanying drawings, which are incorporated in and constitute a part of this specification, illustrate the invention and, together with the description, explain the invention. In the drawings.

FIG. 5A-5C illustrate exemplary data structures according to an implementation described herein;

DETAILED DESCRIPTION

Figure 1A:
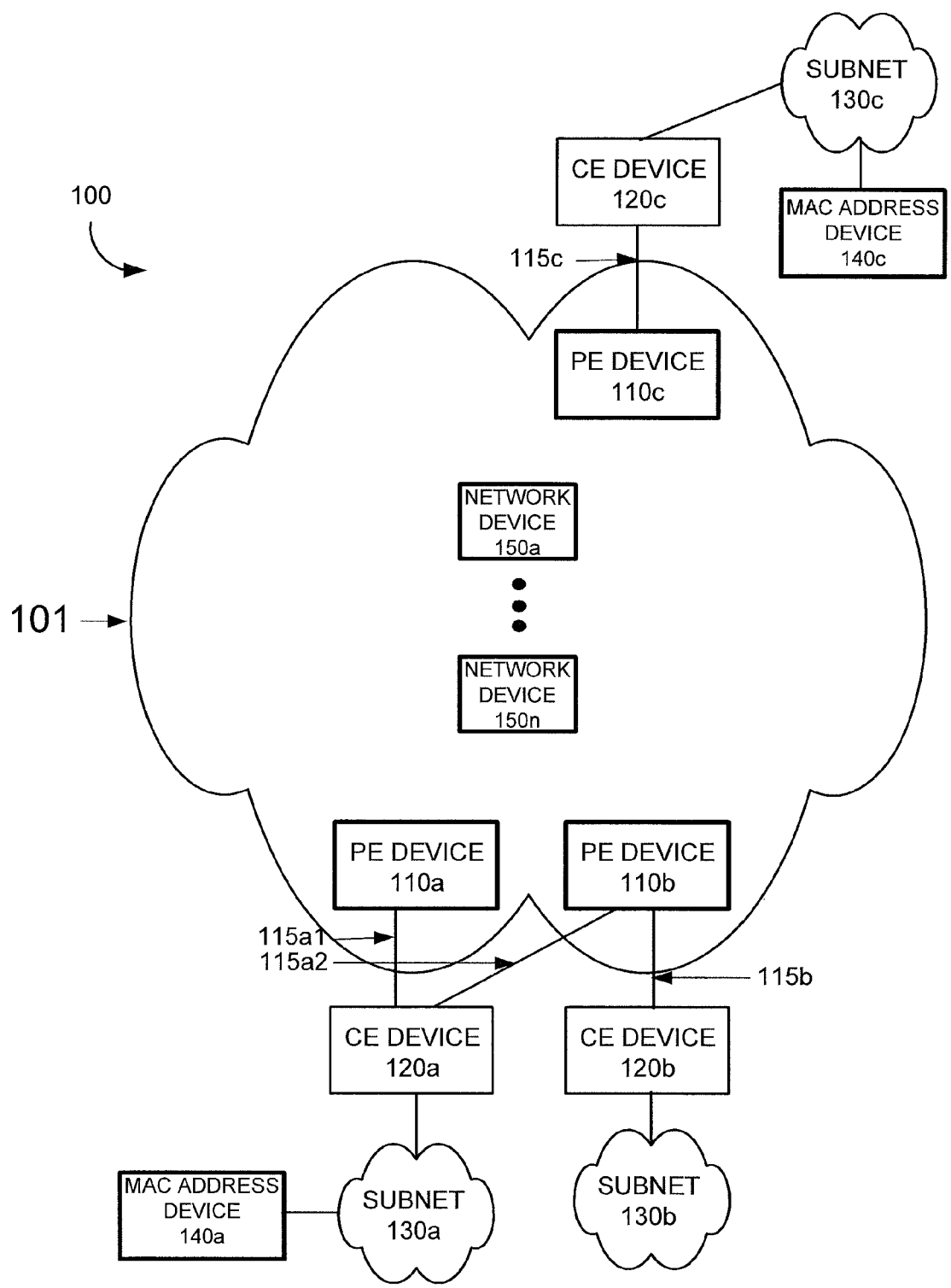
FIG. 1A-1D are diagrams illustrating exemplary systems according to an implementation described herein.

The following detailed description refers to the accompanying drawings. The same reference numbers may be used in different drawings to identify the same or similar elements. Also, the following detailed description does not limit the invention. Instead, the scope of the invention is defined by the appended claims and equivalents.

A customer may connect to the network of a network service provider through a customer edge (CE) device. The CE device may include a switch or a router that acts as a gateway from the customer's network to the service provider's network. The customer edge device may connect to the network through a provider edge (PE) device. The provider edge device may include any network element with routing functions (e.g., a router). Customers often want multiple connections, also known as multi-homed connections, to a provider's network for redundancy. Thus, one CE device may connect to multiple PE devices and such a CE device may be referred to as a multi-homed device. In contrast, a CE device may only connect to a single PE device and may be referred to as a single-homed device.

For a given multi-homed CE device, one of the PE devices, to which the multi-homed CE device is connected, may be designated as a primary PE device and the other PE devices of the multi-homed connection may serve as back up devices. If the primary PE device in a multi-homed connection fails, the CE device may automatically switch to another PE device. However, if only the primary PE device of a multi-homed connection is used, the connections to the other PE devices may not be used and may be considered a resource that is not utilized to its full potential. A customer that is paying for multiple connections may want to get full use out of all the connections.

Implementations described herein may relate to a VPLS that provides equal-cost multi-path connections. An equal-cost multi-path connection may use all connections of a multi-homed CE device, rather than just using one connection as a primary connection and relying on the other connections as backup connections. In a standard Ethernet network, equal-cost multi-path routing may be accomplished using link aggregation (LAG). Link aggregation may refer to using multiple network cables and/or ports in parallel to increase both link speed and redundancy. For example, if multiple links exist between two neighboring devices, the first device may alternate between the links when sending data to the second device. Data units that are sent from the first device to the second device may be hashed, based on a hash function, to one of the available links, and the hash function may be chosen such that over time data units are equally distributed over the available links.

However, when multiple connections do not exist between two neighboring devices, but from one device to multiple devices (e.g., from one CE device to multiple PE devices), standard link aggregation may not be applicable, because the multiple devices maintain different media access control (MAC) tables and may have different routes to the destination device. In a VPLS system, traffic may travel from one CE device to a physically remote CE device across a network via emulated point-to-point layer 2 connections. Such emulated point-to-point layer 2 connections may be referred to as "pseudowires," because from the point of view of the Ethernet network, such a connection may behave as if a physical wire were present between the two devices.

An implementation described herein may provide link aggregation for multi-homed CE devices by providing a different pseudowire from a PE device for each multi-homed CE device connected to the PE device in a VPLS system. While single-homed CE devices connected to a PE device may send traffic via a single pseudowire, each multi-homed CE device may use a pseudowire dedicated for that multi-homed CE device. In one implementation, different pseudowires may be implemented via different labels, such as different packet headers.

Furthermore, when a CE device is connected to multiple PE devices (i.e. the CE device is a multi-homed device), and when one of the connection fails, flushing, flooding and re-learning of all MAC addresses may need to be performed by a PE device that was acting as a backup device. This may require large amounts of processing and may tie up network resources. Implementations described herein may provide a multi-homed VPLS system that does not need MAC flushing. This may be accomplished by maintaining MAC tables based on CE devices, for CE devices local to a PE device, and based on site numbers, for CE devices remote from the PE device. For example, a MAC address may be associated with a site number and a link aggregation table may maintain a list of pseudowires through which the site number may be reached. If a particular connection fails, the pseudowire associated with the failed connection may be removed from the link aggregation table, and no MAC flushing may need to occur.

Moreover, when a CE device is connected to a first PE device and a second PE device, and the connections are equal-cost, meaning that link aggregation is used to transfer data via both connections in a VPLS system, when a particular VPLS packet is flooded through the first PE device, it may be forwarded to the second PE device and back to the CE device, thereby causing a loop. An implementation described herein may relate to avoiding causing loops by not flooding packets back to a multi-homed CE device, by recognizing that a packet originated from a multi-homed CE device that is also connected to a particular PE device that received the packet.

Exemplary Network

FIG. 1A is a diagram illustrating an exemplary VPLS system 100 according to an implementation described herein. VPLS system 100 may include a network 101, one or more PE devices 110 (referred to collectively as "PE devices 110," and individually as "PE device 110"), one or more CE devices 120 (referred to collectively as "CE devices 120," and individually as "CE device 120"), one or more subnets 130, one or more MAC address devices 140, and one or more network devices 150. Network 101 may be a packet-based network. The term "packet," as used herein, may refer to a data unit transmitted over network 101, and may include a packet, datagram, or cell; a fragment of a packet, datagram, or cell; or other types of data units. For example, a packet may refer to an Internet Protocol (IP) packet that has been pre-pended with additional header fields (e.g., packet classification information, addresses, etc.).

PE devices 110 may include any network device with routing functions (e.g. a layer 3 device, and may connect a CE device 120 to network 101. CE devices 120 may include any device with switching or routing functions (e.g., a layer 2 or a layer 3 device), and may connect a customer's subnet 130 to network 101. Subnets 130 may an Ethernet network, such as a local area network (LAN). MAC address devices 140 may include any electronic device with a MAC address, such as a computer, a server, a microcontroller, an input or output device (e.g., a printer, display device, camera, or a sensor), or any other electronic device with communication capabilities and a network interface card. Network devices 150 may include any switching or routing device in network 101 that is not a provider edge device in VPLS system 100.

A CE device 120 may be a single-homed device, meaning the CE device only has one connection to network 101. For example, CE device 120b and CE device 120c in FIG. 1A may be single-homed devices, because CE device 120b is only connected to PE device 110b, and CE device 120c is only connected to PE device 110c. Alternatively, a CE device 120 may be a multi-homed device. For example, CE device 120a in FIG. 1A may be a multi-homed device, because CE device 120a is connected to both PE device 110a and PE device 110b.

VPLS system 100 may allow MAC address devices 140 to communicate with each other as if connected to the same LAN. For example, MAC address device 140a may need to communicate with MAC address device 140c. MAC address device 140a may send an Ethernet frame via subnet 130a to CE device 120a. CE device 120a may forward the Ethernet frame to either PE device 110a or PE device 110b. Assume CE device 120a sends the Ethernet frame to PE device 110a.

PE device 110a may convert the Ethernet frame to a VPLS packet. PE device 110a may either know or not know how to reach MAC address device 140c. If PE device 110a does not know how to reach MAC address device 140*a*, PE device 110*a* may flood the VPLS packet to all the PE devices in VPLS system 100. If PE device 110*a* knows how to reach MAC address device 140*a*, PE device 110*a* may forward the VPLS packet to PE device 110*c*. In either case, the VPLS packet may be routed to PE device 110*c*. The VPLS packet may have to travel through network 101 to reach PE device 110*c*, and be routed toward PE device 110*c* by one or more network devices 150*a*-150*n*.

Once the VPLS packet reaches PE device 110*c*, PE device 110*c* may retrieve the Ethernet frame from the VPLS packet and forward the Ethernet frame to CE device 120*c*. CE device 120*c* may forward the Ethernet frame to destination MAC address device 140*c*. Thus, MAC address device 140*a* and MAC address device 140*c* may communicate as if connected to the same LAN.

Figure 1B:
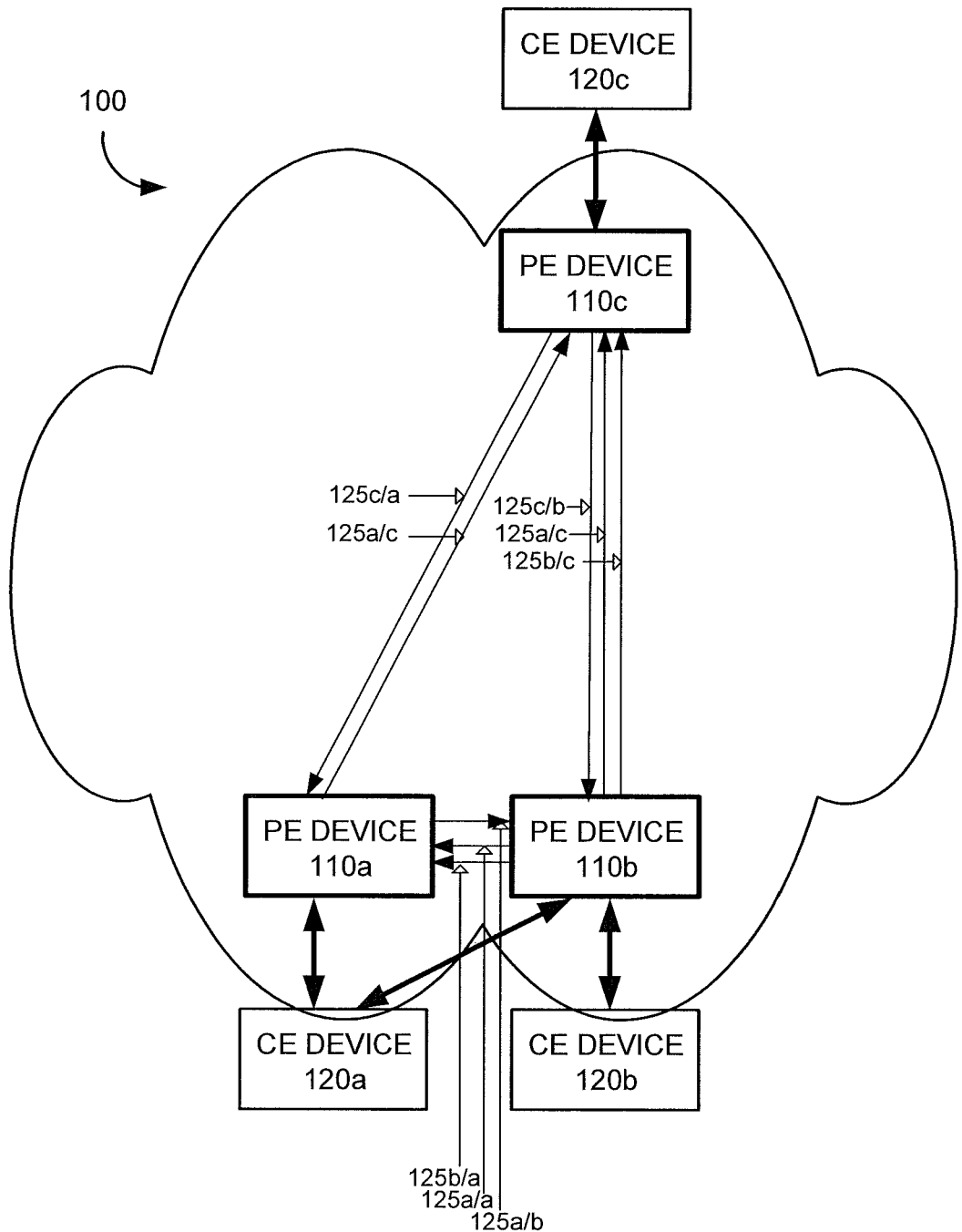

FIG. 1B is a diagram illustrating VPLS system 100 of FIG. 1A in terms of pseudowires, according to an implementation described herein. From the point of view of VPLS system 100, it may not matter how Ethernet frames from one CE device reach another CE device. The Ethernet frames may be encapsulated in VPLS packets, and the VPLS packets may be routed through network 101 as if actual physical layer 2 point-to-point connections existed between the CE devices. These emulated physical layer 2 point-to-point connections may be represented as pseudowires. Because every CE device may need to reach every other CE device in VPLS system 100, the pseudowires may include a full mesh configuration. In other words, every PE device may have a pseudowire to each other PE device in VPLS system 100.

According to an implementation described herein, each multi-homed CE device may include a separate pseudowire. Thus, in FIG. 1B, PE device 110*a* may be only connected to CE device 120*a*. Thus PE device 110*a* may have a single pseudowire 125*a/c* leading from PE device 110*a* to PE device 110*c*, and a single pseudowire 125*a/b* leading from PE device 110*a* to PE device 110*b*. Similarly, PE device 110*c* may only be connected to CE device 110*c*, and thus may have a single pseudowire 125*c/a* leading from PE device 110*c* to PE device 110*a*, and a single pseudowire 125*c/b* leading from PE device 110*c* to PE device 110*b*.

PE device 110*b* may be connected to CE device 120*a* and to CE device 120*b*. Thus, PE device 110*b* may have a pseudowire 125*a/c* leading from PE device 110*b* to PE device 110*c* and a pseudowire 125*a/a* leading from PE device 110*b* to PE device 110*a*. Pseudowires 125*a/c* and 125*a/a* may forward VPLS packets that include Ethernet frames originating from CE device 120*a*. Additionally, PE device 110*b* may have a pseudowire 125*b/c* leading from PE device 110*b* to PE device 110*c* and a pseudowire 125*b/a* leading from PE device 110*b* to PE device 110*a*. Pseudowires 125*b/c* and 125 *b/a* may forward VPLS packets that include Ethernet frames originating from CE device 120*b*.

Figure 1C:
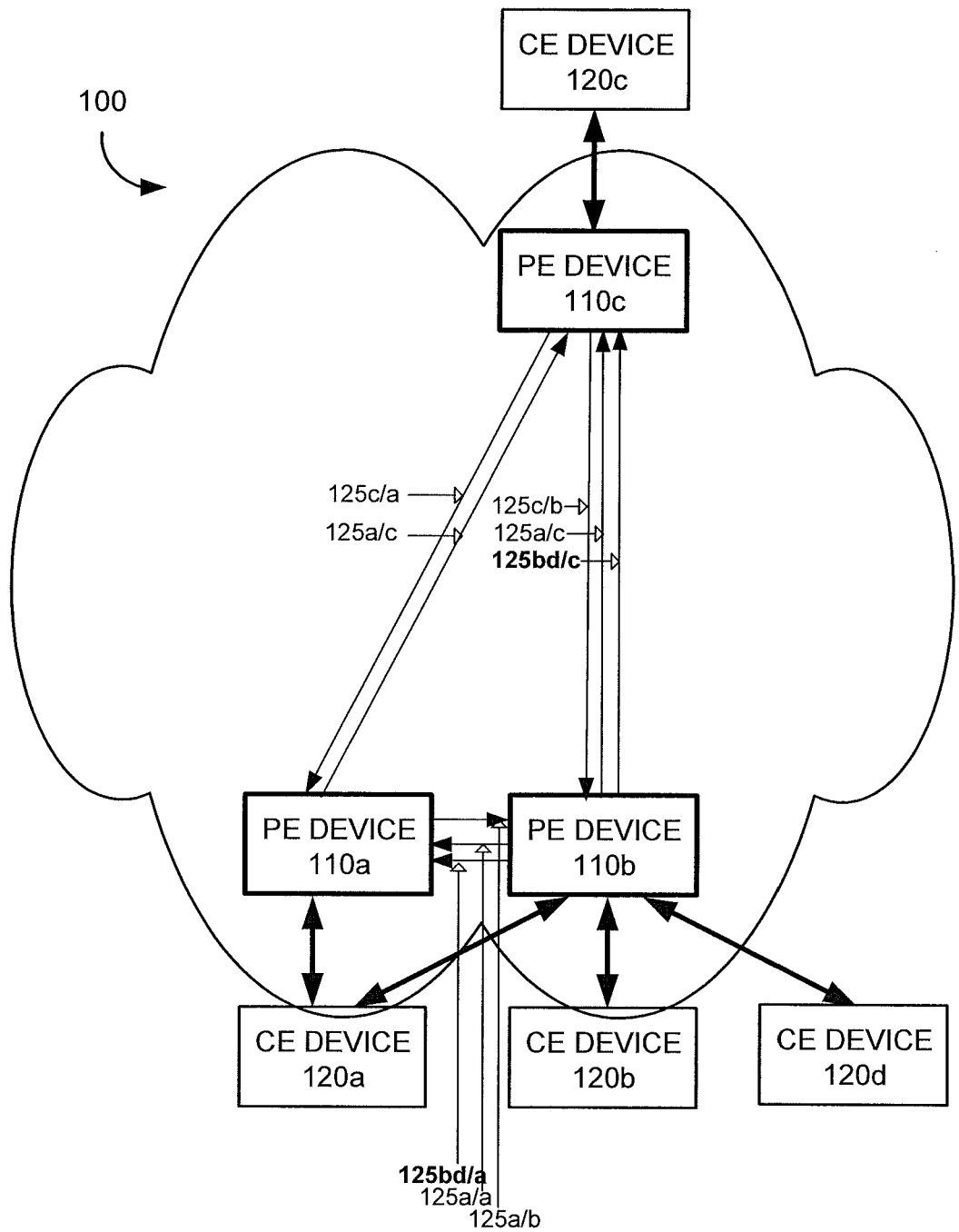

FIG. 1C is a diagram illustrating VPLS system 100 of FIG. 1B if another single-homed connection is added to PE device 110*b*. Assume CE device 120*d* is connected to PE device 110*b* and assume CE device 120*d* is single-homed. Because CE device 120*d* is single-homed, a new pseudowire may not need to be created. Thus, pseudowire 125*bd/c* may transmit Ethernet frames from both CE device 120*b* and CE device 120*d* to PE device 110*c*, and pseudowire 125*bd/a* may transmit Ethernet frames from both CE device 120*b* and CE device 120*d* to PE device 110*a*.

Thus, in an implementation described herein, adding new single-homed devices may not require the addition of new pseudowires. This may be because for link aggregation purposes, single-homed CE devices may only be reachable via a single PE device. Thus, a remote PE device may not need to know alternate routes to reach a single-homed CE device for link aggregation purposes, and may not need to learn MAC addresses separately for single-homed CE devices, because a destination MAC address may only be reachable via one route.

Figure 1D:
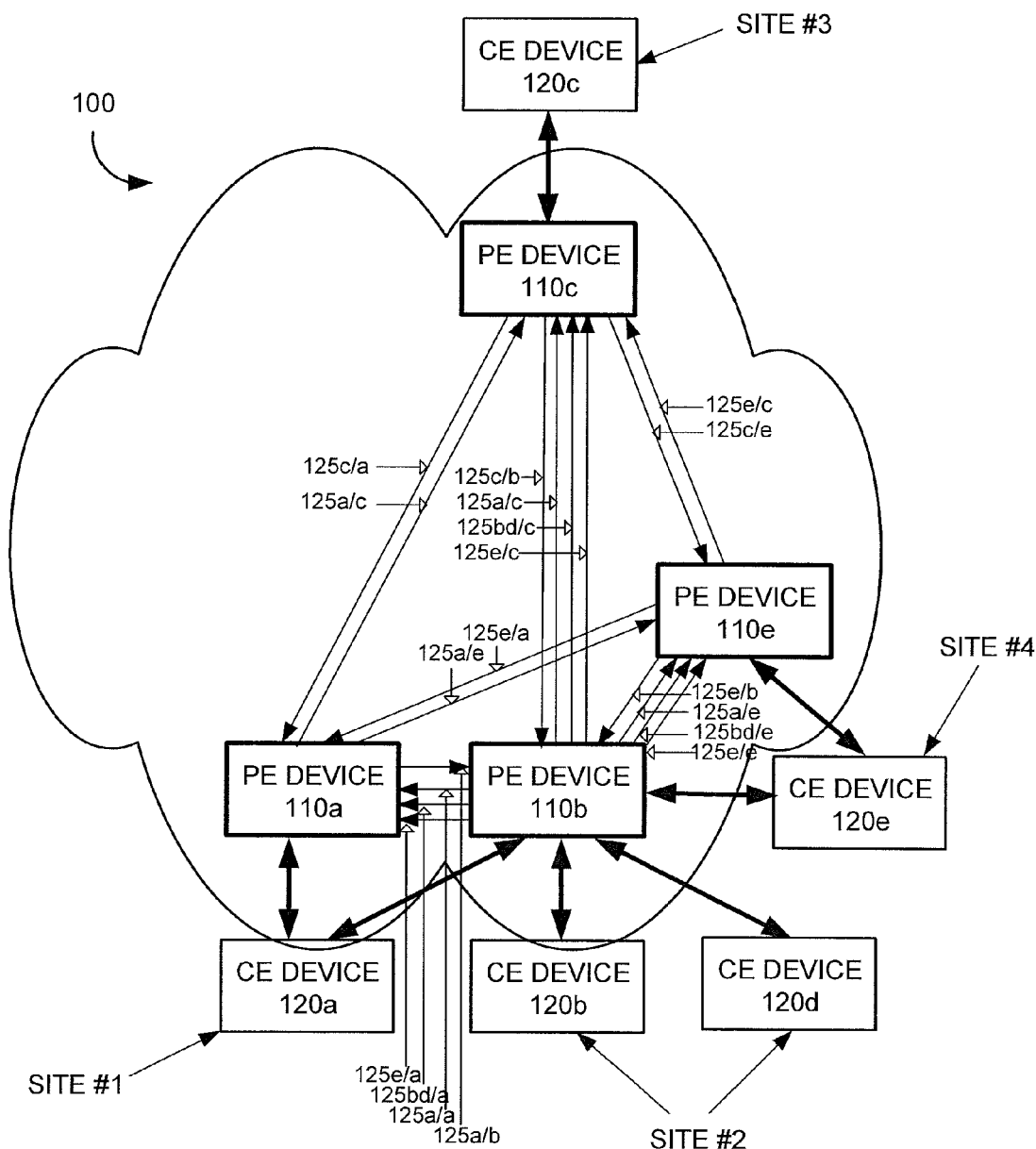

FIG. 1D is a diagram illustrating VPLS system 110 of FIG. 1C if another multi-homed connection is added to VPLS system 110. Assume new PE device 110*e* is added to VPLS system 110 and assume a new multi-homed CE device 120*e* is added to VPLS system 110, with a connection to PE device 110*b* and a connection to PE device 110*e*. Because CE device 120*e* is a multi-homed device, both PE device 110*b* and PE device 110*e* may need to create a new pseudowire. Additionally, all the PE devices in VPLS system 110 may need to create pseudowires to new PE device 110*e*.

PE device 110*b* may now have three pseudowires to the other PE devices. PE device 110*b* may have a pseudowire for all the single-homed CE devices (i.e., CE device 120*b* and CE device 120*d*), a pseudowire for multi-homed CE device 120*a*, and a pseudowire for multi-homed device 120*e*. Thus, pseudowire 125*bd/a* may send Ethernet frames from CE device 120*b* or CE device 120*d* to PE device 110*a*; pseudowire 125*a/a* may send Ethernet frames from CE device 120*a* to PE device 110*a*; pseudowire 125*e/a* may send Ethernet frames from CE device 120*e* to PE device 110*a*; pseudowire 125*bd/c* may send Ethernet frames from CE device 120*b* or CE device 120*d* to PE device 110*c*; pseudowire 125*a/c* may send Ethernet frames from CE device 120*a* to PE device 110*c*; pseudowire 125*e/c* may send Ethernet frames from CE device 120*e* to PE device 110*c*; pseudowire 125*bd/e* may send Ethernet frames from CE device 120*b* or CE device 120*d* to PE device 110*e*; pseudowire 125*a/e* may send Ethernet frames from CE device 120*a* to PE device 110*e*; and pseudowire 125*e/e* may send Ethernet frames from CE device 120*e* to PE device 110*e*.

PE device 110*a* may have a new pseudowire 125*a/e* that may send Ethernet frames from CE device 120*a* to new PE device 110*e* and PE device 110*c* may have a new pseudowire 125*c/e* that may send Ethernet frames from CE device 120*c* to PE device 110*e*. New PE device 110*e* may have a pseudowire 125*e/a* that may send Ethernet frames from CE device 120*e* to PE device 110*a*; a pseudowire 125*e/b* that may send Ethernet frames from CE device 120*e* to PE device 110*b*; and a pseudowire 125*e/c* that may send Ethernet frames from CE device 120*e* to PE device 110*c*.

CE devices 120 in VPLS system 100 may be assigned site numbers within VPLS system 110. Each multi-homed CE device 120 may be referred to by a particular site number, while all single-homed CE devices 120 connected to a particular PE device 110 may be referred to by a particular site number. Using FIG. 1D as an example, CE device 120*a* may be referred to as site number one, CE device 120*b* and CE device 120*d* may be referred to as site number two, CE device 120*c* may be referred to as site number three, and CE device 120*e* may be referred to as site number four.

Although FIGS. 1A-1D shows exemplary components of VPLS system 100, in other implementations, VPLS system 100 may include fewer, different, or additional components than depicted in FIGS. 1A-1D. In still other implementations, one or more components of VPLS system 100 may perform a task described as being performed by one or more other components of VPLS system 100.

Exemplary VPLS Packet

Figure 2:
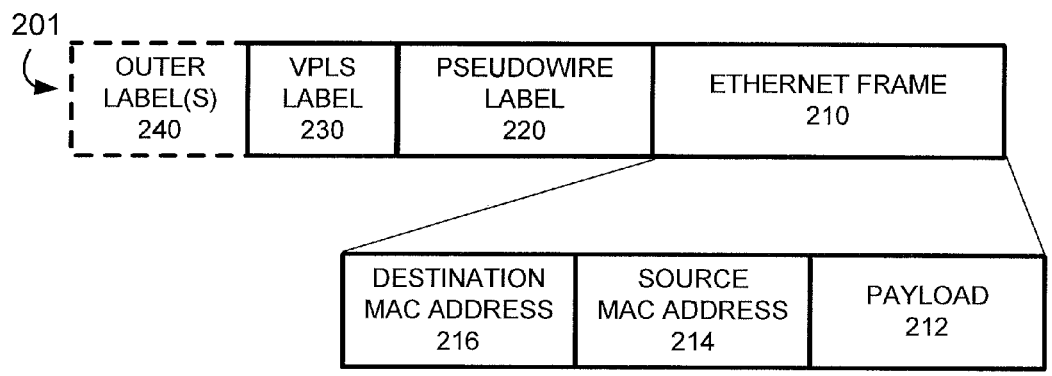
FIG. 2 is a diagram illustrating an exemplary packet according to an implementation described herein.

FIG. 2 is a diagram illustrating an exemplary VPLS packet 201 that may be transmitted over network 100 according to an implementation described herein. Packet 201 may include an Ethernet frame 210, a pseudowire label 220, a VPLS label 230, and one or more outer labels 240.

Ethernet frame 210 may represent a layer 2 protocol data unit transmitted across a LAN subnet, or from one LAN subnet to another LAN subnet (e.g., from subnet 130*a* to subnet 130*c*). Ethernet frame 210 may include a payload 212, a source MAC address 214, and a destination MAC address 216. Payload 212 may include the data that is to be transmitted. Source MAC address 214 may include the MAC address of a device that sent Ethernet frame 210, and destination MAC address 216 may include the MAC address of a device that is the intended recipient of the data included in payload 212.

Pseudowire label 220 may identify VPLS packet 201 with a particular pseudowire label, and may include information identifying a particular CE device and/or a particular PE device. VPLS label 230 may associate VPLS packet 201 with VPLS system 100 and may allow VPLS packet 201 to be routed from a source PE device to a destination PE device, using one or more of network devices 150*a*-150*n*. For example, VPLS label 230 may allow VPLS packet 201 to be routed through network 101 using a label-switched path.

Outer labels 240 may be added to packet 201 as packet 201 is being routed through network 110 from one PE device to another PE device (e.g. via network devices 150*a*-150*n*). Outer labels 240 may include, for example, a next hop Border Gateway Protocol (BGP) header.

As an example, assume MAC address device 140*a* send data to MAC address 140*c*. The data may be included in payload 212 of Ethernet frame 210, source MAC address 214 may include the MAC address of MAC address device 140*a*, and destination MAC address 216 may include the MAC address of MAC address device 140*c*. Ethernet frame 210 may be broadcast on subnet 130*a* and may reach CE device 120*a*. CE device 120*a* may include destination MAC address 216 in a MAC table of CE device, and may determine that destination MAC address 2165 is reachable through the port that leads through network 101.

CE device 120*a* may hash Ethernet frame 210 via one of the connections to PE devices. Assume CE device 120*a* hashes Ethernet frame 210 to PE device 110*a*. PE device 110*a* may add VPLS label 230 to Ethernet frame 210 to form VPLS packet 201. Additionally, CE device 120*a* may add pseudowire label 230 to VPLS packet 201

PE device 110*b* may determine that VPLS packet 201 was received from CE device 110*a*, and may add pseudowire label 220. Pseudowire label 220 may associate VPLS packet 201 with CE device 120*a* and/or with pseudowire 125*a/c*. VPLS packet 201 may be sent to PE device 110*c* across network 101. When PE device 110*c* receives VPLS packet 201, PE device 110*c* may look up destination MAC address 216, determine that destination MAC address 216 is reachable through CE device 120*c*, remove pseudowire label 220 and VPLS label 230 to retrieve Ethernet frame 210, and forward Ethernet frame 210 to CE device 120*c*. CE device 120*c* may forward Ethernet frame 210 to the MAC address device associated with destination MAC address 216.

Although FIG. 2 shows exemplary components of packet 201, in other implementations, packet 201 may contain fewer, different, additional, or differently arranged data items than depicted in FIG. 2. In still other implementations, one or more data items of packet 201 may include information described as being included in one or more other data items of packet 201. For example, while VPLS label 230 and pseudowire label 220 have been described as two distinct labels, in another implementation, information included in pseudowire label 220 may be included in VPLS label 230. Thus, a VPLS label and pseudowire labels may be represented as different values included in VPLS label 230. Furthermore, an Ethernet frame may include other fields which were excluded from FIG. 2 for simplicity's sake. For example, Ethernet frame 210 may include a type field for specifying a type of Ethernet frame, or a VLAN field for identifying a particular VLAN associated with Ethernet frame 210.

Exemplary Network Element

Figure 3:
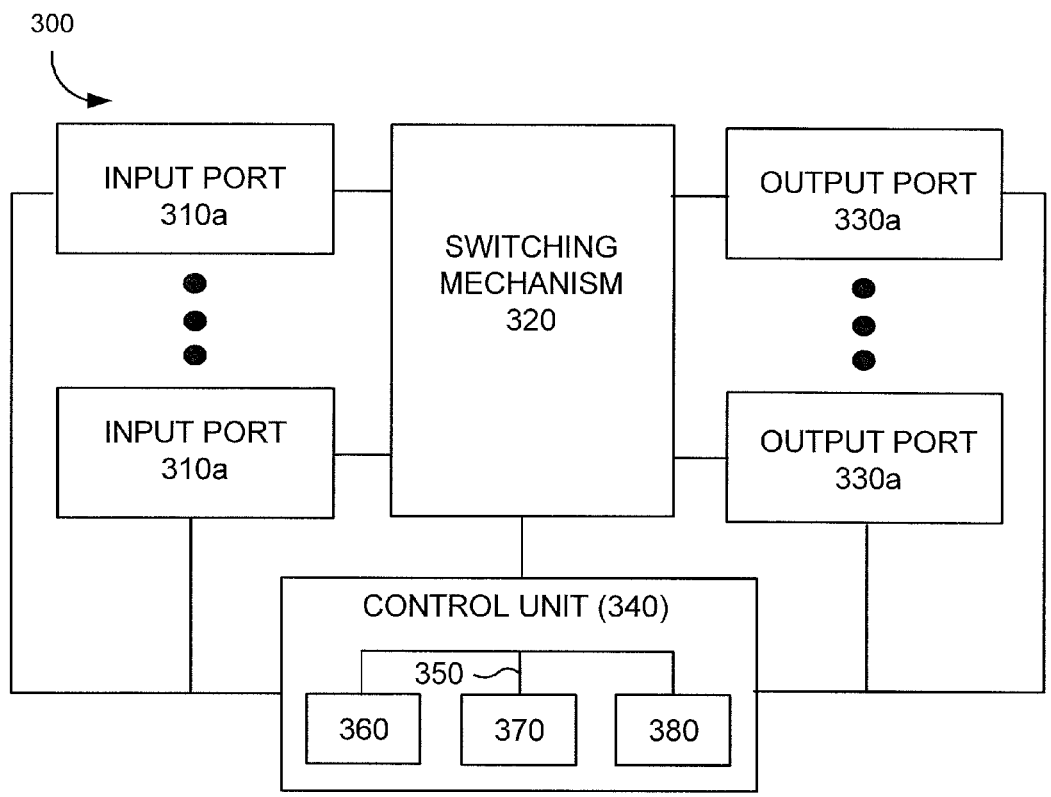
FIG. 3 is a diagram illustrating an exemplary network element according to an implementation described herein.

FIG. 3 is a diagram illustrating an exemplary network device 300 that may correspond to one of the PE devices or CE devices illustrated in FIGS. 1A and 1B. Network device 300 may include input ports 310*a*-310*n*, a switching mechanism 320, output ports 330*a*-330*n*, and/or a control unit 340. Input ports 310*a*-310*n* may be the points of attachments for physical links and may be the points of entry for incoming traffic. Switching mechanism 320 may interconnect input ports 310*a*-310*n* with output ports 330*a*-330*n*. Output ports 330*a*-330*n* may store the traffic and may schedule the traffic on one or more output physical links. Control unit 340 may use routing protocols and may create a forwarding table that is used in traffic forwarding.

Input ports 310*a*-310*n* may perform datalink layer encapsulation and decapsulation. Input ports 310*a*-310*n* may look up a destination address of incoming traffic (e.g., any type or form of data, such as packet or non-packet data) in a forwarding table to determine its destination port (i.e., route lookup). In order to provide quality of service (QoS) guarantees, input ports 310*a*-310*n* may classify traffic into predefined service classes. Input ports 310*a*-310*n* may run datalink-level protocols and/or network-level protocols.

Switching mechanism 320 may include switching fabric that provides links between input ports 310*a*-310*n* and output ports 330*a*-330*n*. For example, switching mechanism 320 may include a group of switching devices that route traffic from input ports 310*a*-310*n* to output ports 330*a*-330*n*.

Output ports 330*a*-330*n* may store traffic before the traffic is transmitted on an output link. Output ports 330*a*-330*n* may include scheduling algorithms that support priorities and guarantees. Output ports 330*a*-330*n* may support datalink layer encapsulation and decapsulation, and/or a variety of higher-level protocols.

Control unit 340 may interconnect with input ports 310*a*-310*n*, switching mechanism 320, and output ports 330*a*-330*n*. Control unit 340 may perform control plane processing, including computing and updating forwarding tables, manipulating QoS tables, maintaining control protocols. Control unit 340 may handle any traffic whose destination address may not be found in the forwarding table.

In one embodiment, control unit 340 may include a bus 350 that may include a path that permits communication among a processor 360, a memory 370, and a communication interface 380. Processor 360 may include a microprocessor or processing logic (e.g., an application specific integrated circuit (ASIC), field programmable gate array (FPGA), etc.) that may interpret and execute instructions, programs, or data structures. Processor 360 may control operation of network device 300 and its components.

Memory 370 may include a random access memory (RAM) or another type of dynamic storage device that may store information and/or instructions for execution by processor 360; a read only memory (ROM) or another type of static storage device that may store static information and/or instructions for use by processor 360; a flash memory (e.g., an electrically erasable programmable read only memory (EE- PROM)) device for storing information and/or instructions; and/or some other type of magnetic or optical recording medium and its corresponding drive. Memory 370 may also be used to store temporary variables or other intermediate information during execution of instructions by processor 360.

Communication interface 380 may include any transceiver-like mechanism that enables control unit 340 to communicate with other devices and/or systems. For example, communication interface 380 may include a modem or an Ethernet interface to a local area network (LAN). Additionally or alternatively, communication interface 380 may include mechanisms for communicating via a wireless network. Communication interface 380 may also include a console port that may allow a user to interact with control unit 340 via a command line interface. A user may configure network device 300 via the console port.

Network device 300 may perform certain operations, as described in detail below. Network device 300 may perform these operations in response to processor 360 executing software instructions contained in a computer-readable medium, such as memory 370. A computer-readable medium may be defined as a physical or logical memory device. A logical memory device may include memory space within a single physical memory device or spread across multiple physical memory devices.

The software instructions may be read into memory 370 from another computer-readable medium, such as a data storage device, or from another device via communication interface 380. The software instructions contained in memory 370 may cause processor 360 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of network device 300, in other implementations, network device 300 may contain fewer, different, or additional components than depicted in FIG. 3. In still other implementations, one or more components of network device 300 may perform one or more of the tasks described below as performed by one or more other components of network device 300.

Figure 4A:
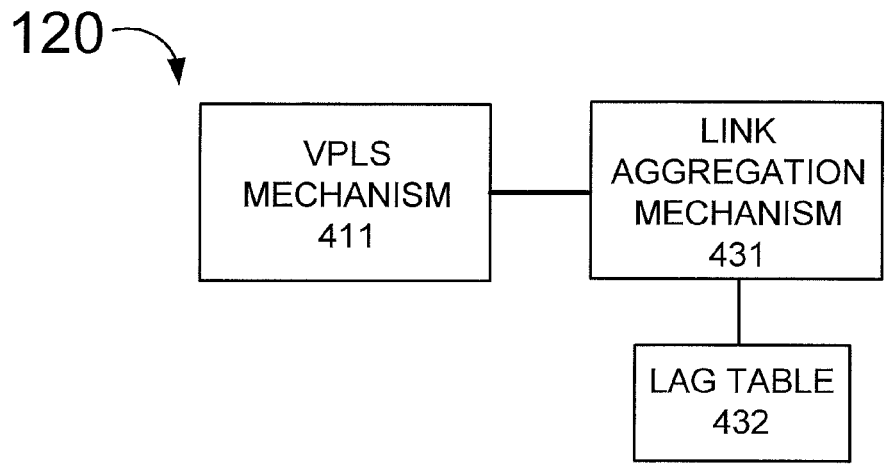
FIG. 4A is a diagram illustrating exemplary functional components of a customer edge device according to an implementation described herein.

FIG. 4A is a diagram illustrating exemplary functional components of CE device 120 according to an implementation described herein. CE device 120 may include a VPLS mechanism 411, a link aggregation mechanism 431, and LAG table 432.

VPLS mechanism 411 may receive an Ethernet frame 210 at a port of CE device 120 associated with subnet 130, and may forward Ethernet frame 210 to a virtual port associated with VPLS system 100. VPLS mechanism 411 may receive Ethernet frame 210 at a virtual port associated with VPLS system 100, and may provide Ethernet frame 210 to a forwarding engine for transmission across subnet 130 to a MAC destination device associated with MAC destination address 216 of Ethernet frame 210.

Link aggregation mechanism 431 may receive Ethernet frame 210 from VPLS mechanism 411 and may perform link aggregation on Ethernet frame 210, if CE device mechanism 431 may add or remove the associated PE device in LAG table 432. In one implementation, LAG table 432 may be updated automatically by link aggregation mechanism 431 based on detecting a change in PE device connections. In another implementation, LAG table 432 may be updated by an administrator. In one implementation, link aggregation mechanism 431 may select a PE device based on a hash function that is designed to select all PE devices 110 from the list over a particular period of time (or over a particular number of Ethernet frames). The hash function may be based, for example, on source MAC address 214. In another implementation, link aggregation mechanism 431 may select PE devices 110 in a round-robin fashion.

Link aggregation mechanism 431 may provide Ethernet frame 210 to a virtual port associated with the selected PE device, for transmission of Ethernet frame 210 to the selected PE device.

Although FIG. 4A shows exemplary functional components of customer edge device 120, in other implementations, customer edge device 120 may include fewer, different, or additional functional components than depicted in FIG. 4A. In still other implementations, one or more functional components of customer edge device 120 may perform the tasks described as being performed by one or more other functional components of customer edge device 120.

Figure 4B:
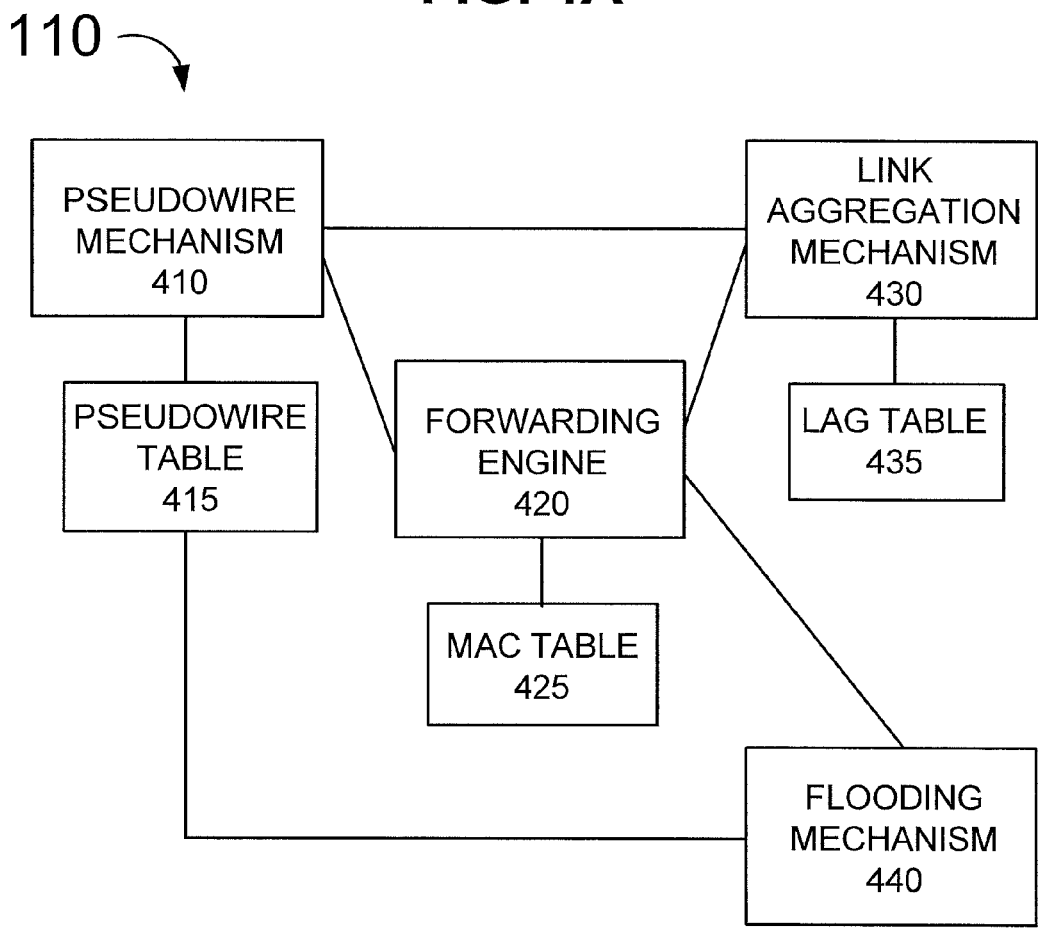
FIG. 4B is a diagram illustrating exemplary functional components of a provider edge device according to an implementation described herein.

FIG. 4B is a diagram illustrating exemplary functional components of a provider edge device 110 according to an implementation described herein. Provider edge device 110 may include a pseudowire mechanism 410, a pseudowire table 415, a forwarding engine 420, a MAC table 425, a link aggregation mechanism 430, a link aggregation table 435, and a flooding mechanism 440.

Pseudowire mechanism 410 may receive Ethernet frame 210 from a CE device, may add VPLS label 230, and may add pseudowire label 220 based on the site from which Ethernet frame 210 was received, and based on the destination site. For example, pseudowire mechanism 410 of PE device 110*b* may add a pseudowire label associated with pseudowire 125*a/c* if a frame was received from CE device 120*a* and it is determined that the destination of the frame is CE device 120*c*. Pseudowire mechanism 410 may receive a destination site from link aggregation mechanism 430.

Pseudowire mechanism 410 may also receive VPLS packets from another PE device and determine which site sent a particular VPLS packet based on pseudowire label 220 of the particular packet. For example, in FIG. 1D, if PE device 110*c* receives a packet via pseudowire 125*bd/c*, pseudowire mechanism 410 may not be able to determine whether the frame was sent from CE device 120*b* or CE device 120*d*, but may only be able to determine that the VPLS packet was received from site number 2. Pseudowire mechanism 410 may remove pseudowire label 220 and VPLS label 230 from the received VPLS packet.

Pseudowire mechanism 410 may assign a pseudowire label to a new site based on a new connection from a CE device to a PE device. Additionally, pseudowire mechanism 410 may receive a new pseudowire label based on a new CE connection being added to a remote PE device. For example, in FIG. 1D, if the connection between CE device 120*e* and PE device 110*b* is added, pseudowire mechanism 410 may create new pseudowire 125*e/c* when sending VPLS packets with frames originating from CE device 120*e* to PE device 110*c*. When pseudowire mechanism 410 of PE device 110*c* receives a VPLS packet via new pseudowire 125*e/c*, pseudowire mechanism 410 of PE device 110*c* may add a new entry to pseudowire table 415 to associate site number 4 with pseudowire 125*e/c*, and may forward this information to link aggregation mechanism 430 to update link aggregation table 435.

Pseudowire mechanism may access pseudowire table 415 during operation. Pseudowire table 415 may store information that associates pseudowire labels with site numbers. FIG. 5A, which is described below, illustrates exemplary fields that may be stored in pseudowire table 415.

Forwarding engine 420 may receive an Ethernet frame from CE device 120, or a VPLS packet from PE device 110 (e.g., from pseudowire mechanism 410). Forwarding engine 420 may consult MAC table 425 and determine whether MAC destination address 216 of the received Ethernet frame 210, or of the received VPLS packet 201, is included in MAC table 425. If the MAC destination address in included in MAC table 425, forwarding engine 420 may provide the information to link aggregation mechanism 430. If the MAC destination address is not included in MAC table 425, forwarding engine 420 may provide Ethernet frame 210, or VPLS packet 201, to flooding mechanism 440. Forwarding engine 420 may also determine whether a frame, or a frame included in a packet, is a multicast or broadcast Ethernet frame. Ethernet frame 210 may include a type field (not shown in FIG. 2) that indicates whether the Ethernet frame is a unicast frame meant for a specific destination or a multicast or broadcast Ethernet frame, meant for multiple destinations. If Ethernet frame 210 is a multicast or broadcast frame, forwarding engine 420 may provide the packet to flooding mechanism 440.

Forwarding engine 420 may also learn MAC addresses from frames and update MAC table 425 with a learned MAC address. Forwarding engine 420 may receive, from pseudowire mechanism 410, information about which site number (if received via VPLS packet 201) or which CE device (if received from a local CE device) sent a frame, based on the pseudowire label associated with the VPLS packet, or based on which virtual port received the Ethernet frame from a local CE device. Forwarding engine 420 may associate the CE device or the site number with MAC source address 214 of the received frame. Forwarding engine 420 may store this information in MAC table 425.

Forwarding engine 420 may access MAC table 425 during operation. MAC table 425 may store information that associates a particular destination MAC address with a CE device or with a site number. FIG. 5B, which is described below, illustrates exemplary fields that may be stored in MAC table 425.

Link aggregation mechanism 430 may perform link aggregation for a packet that is to be sent to a particular PE device 110. Link aggregation mechanism 430 may receive, from forwarding engine 420, information regarding a site number to which a packet is to be sent. Link aggregation mechanism 430 may consult link aggregation (LAG) table 435 for a list of pseudowires through which the site number may be reached. Link aggregation mechanism 430 may select one of the pseudowires and send the packet to the selected pseudowire. In one implementation, link aggregation mechanism 430 may perform a hash function to select a pseudowire. The hash function may be designed to select each pseudowire from a list of pseudowires equally over a period of time. The hash function may be based on one or more layer 2 parameters, such as source MAC address 214; on one or more layer 3 parameters, such as an IP address or port number; on a combination of layer 2 and layer 3 parameters; or on other types of parameters. In another implementation, link aggregation mechanism 430 may perform a round-robin selection of pseudowires. Once link aggregation mechanism 430 selects a particular pseudowire from LAG table 435, link aggregation mechanism 430 may provide information about the selected pseudowire to pseudowire mechanism 410, and pseudowire mechanism 410 may create VPLS packet 201 with pseudowire label 220 associated with the selected pseudowire.

Link aggregation mechanism 430 may update link aggregation table 435 based on new information received from pseudowire mechanism 410. If pseudowire mechanism 410 adds a new entry to pseudowire table 415, link aggregation mechanism 430 may update the appropriate entry in link aggregation table 435. For example, in FIG. 1D, if the connection between CE device 120e and PE device 110b is added, link aggregation mechanism 430 of PE device 110c may add pseudowire 125c/b to a list of pseudowires which can be used to reach site number 4.

Link aggregation mechanism 430 may access link aggregation table 435 during operation. Link aggregation table 435 may store information that associates a particular site number with one or more pseudowires through which the particular site number may be reached. FIG. 5C, which is described below, illustrates exemplary fields that may be stored in link aggregation table 435.

Flooding mechanism 440 may flood frames and/or packets. Flooding mechanism 440 may flood frames and/or packets in such a way as to prevent frames and/or packets from traveling in loops. If Ethernet frame 210 was received by PE device 110 from CE device 120, flooding mechanism 440 may send Ethernet frame 210 to all available destinations. For example, flooding mechanism 440 may forward Ethernet frame 210 to all other CE devices connected to PE device 110, and to all other PE devices 110 in VPLS system 100. If VPLS packet 201 was received from PE device 110, flooding mechanism 440 may send Ethernet frame 210, included in VPLS packet 201, to all CE devices directly connected to the PE device, with the exception of an originating CE device (e.g., while excluding a CE device associated with pseudowire label 220 of VPLS packet 201). Not sending Ethernet frame 210 to the CE device associated with the pseudowire label of VPLS packet 201 may avoid sending the frame to a CE device from which the frame originated, thereby avoiding the frame traveling in a loop.

Flooding mechanism 440 may consult pseudowire table 415 to determine whether to exclude a site from receiving a frame. Pseudowire table 415 may include information about which sites are neighbors (i.e., connected to the PE device that is about to flood the packet).

Although FIG. 4B shows exemplary functional components of provider edge device 110, in other implementations, provider edge device 110 may include fewer, different, or additional functional components than depicted in FIG. 4B. In still other implementations, one or more functional components of provider edge device 110 may perform the tasks described as being performed by one or more other functional components of provider edge device 110.

FIG. 5A-5C illustrate exemplary data structures according to implementations described herein. FIG. 5A illustrates exemplary fields that may be stored in pseudowire table 415. Pseudowire table 415 may include a VPLS identifier field 505, a pseudowire label field 510, a site number field 520, and a neighbor field 525. VPLS identifier field 505 may associate pseudowire table 415 with VPLS system 100, since a PE device may be associated with multiple VPLS systems.

Pseudowire label field 510 may include a list of pseudowire labels that may be included in packets received by pseudowire mechanism 410. Site number field 520 may store information about a particular site associated with a particular pseudowire label. If a pseudowire label is associated with a multi-homed CE device 120, the site number may correspond to the multi-homed CE device 120. If a particular pseudowire label is associated with a single-homed CE device, the site number may correspond to all single-homed CE devices 120 reachable by the particular pseudowire label. Neighbor field 525 may store an indication of whether a pseudowire label 510 and/or site is a neighbor of the PE device. A neighboring CE device may be a CE device that has a connection to the PE device. For example, in FIG. 1D, PE device 110b has as its neighbors CE device 120*a*, CE device 120*b*, CE device 120*d*, and CE device 120*e*. Neighbor field 525 may be used, for example, by flooding mechanism 440 to determine whether to exclude a CE device during flooding of a frame, to avoid sending a frame back to a CE device from which the frame originated, thereby avoiding a loop.

Although FIG. 5A show exemplary fields that may be stored in pseudowire table 415, in other implementations, pseudowire table 415 may contain fewer, different, differently arranged, or additional fields than depicted in FIG. 5A.

FIG. 5B illustrates exemplary fields that may be stored in MAC table 425. MAC table 425 may include VPLS identifier field 505, a MAC address field 530 and a site number/CE device field 540. MAC address field 530 may store a particular MAC address of VPLS system 100. Site number/CE device field 540 may associate a particular site number or a particular CE device with a MAC address stored in MAC address field 530. For example, if the MAC address was learned from a remote site, MAC table 425 will associate, with the MAC address, the site number from which the MAC address was learned. For example, if, in FIG. 1D, PE device 110*b* receives a VPLS packet 201 from PE device 110*c*, forwarding engine 420 of PE device 110*b* may associate source MAC address 214 of VPLS packet 201 with site number three. On the other hand, if PE device 110*b* receives Ethernet frame 210 from CE device 120*b*, forwarding engine 420 of PE device 110*b* may associate MAC address 214 of Ethernet frame 210 with CE device 120*b*. Assume further that the Ethernet frame 210 from CE device 110*b* is destined for CE device 120*c*. When PE device 110*c* receives VPLS packet 201 that includes Ethernet frame 210, forwarding engine 420 of PE device 110*c* may associate source MAC address 214 with site number two, because PE device 110*c* will not be able to determine whether Ethernet frame 210 originated from CE device 120*b* or CE device 120*d*.

Although FIG. 5B show exemplary fields that may be stored in MAC table 425, in other implementations, MAC table 425 may contain fewer, different, differently arranged, or additional fields than depicted in FIG. 5B.

FIG. 5C illustrates exemplary fields that may be stored in link aggregation table 435. Link aggregation table 435 may include VPLS identifier field 505, a site number field 550, and pseudowire fields 560*a*-560*n* associated with site numbers stored in site number field 550.

Site number field 550 may store information regarding a particular site number and pseudowire fields 560*a*-560*n* may store information regarding one or more pseudowires that may be used to reach the particular site number. For example, in FIG. 1D, link aggregation table 435 of PE device 110*c* may associate site number 1 with pseudowire 125*c*/a and pseudowire 125*c*/b, since site number 1 may be reached through PE device 110*a* and through PE device 120*b*.

Although FIG. 5C show exemplary fields that may be stored in link aggregation table 435, in other implementations, link aggregation table 435 may contain fewer, different, differently arranged, or additional fields than depicted in FIG. 5C.

Exemplary Processes

Figure 6A:
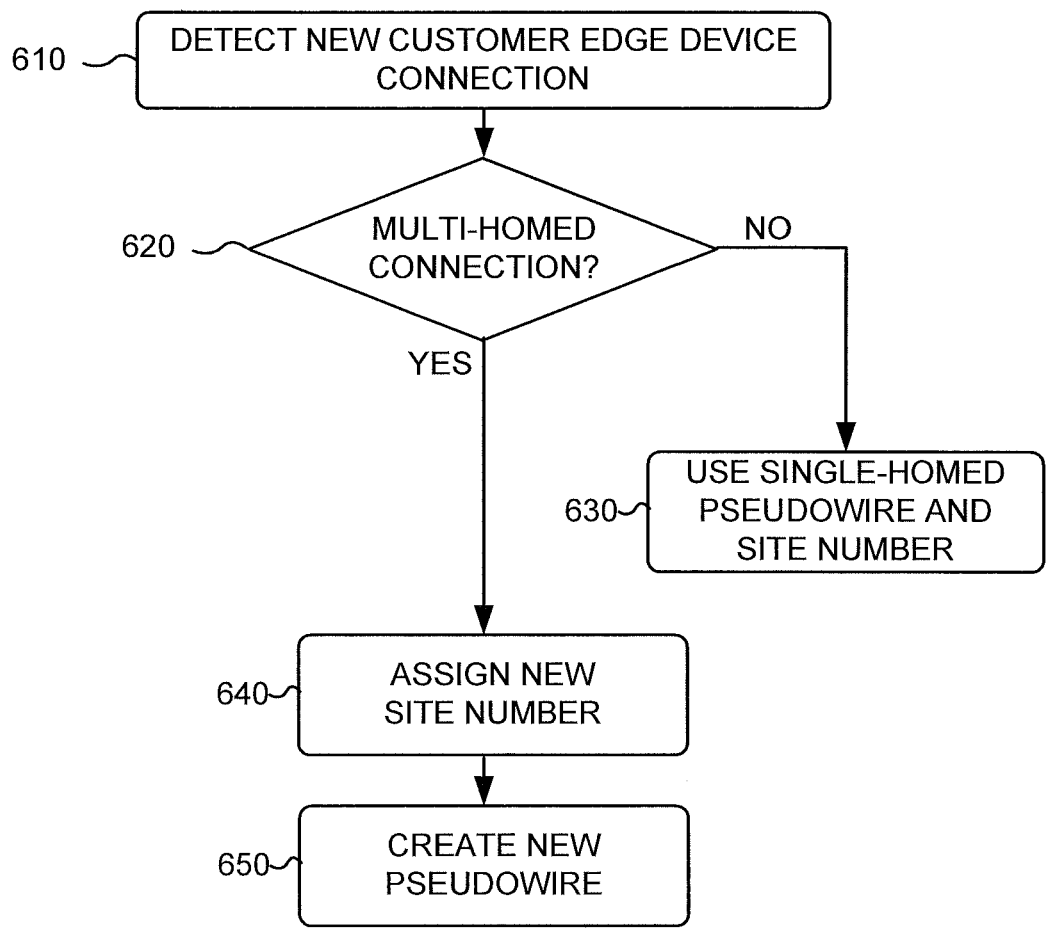
FIG. 6A is a flow chart illustrating a process of adding a new customer edge device to a VPLS according to an implementation described herein.

FIG. 6A is a flow chart illustrating a process of adding a new customer edge device to a VPLS according to an exemplary implementation. In one implementation, the process illustrated in FIG. 6A may be performed by one or more components of a particular PE device 110. In other implementations, the process illustrated in FIG. 6A may be performed by another device or group of devices separate from or including a particular PE device 110.

The process of FIG. 6A may include detecting a new CE device connection (block 610). A new CE device may be physically connected to PE device 110 and added to an existing VPLS, or a CE device that has been previously connected to PE device 110 may added to the existing VPLS. In one implementation, pseudowire mechanism 410 may automatically detect that a new CE device has been connected to PE device 110 and may add the new CE device to pseudowire table 415.

In another implementation, pseudowire table 415 may be configured manually by an administrator. For example, after a new CE device is connected to PE device 110 and the ports of PE device 110 are reconfigured, the administrator may add the new CE device to pseudowire table 415, as well as an indication that the new CE device is a neighbor of the PE device.

A determination may be made whether the detected connection is a multi-homed connection (block 620). For example, pseudowire mechanism 410 may determine whether the new CE device connection is multi-homed. In other words, pseudowire mechanism 410 may determine whether the CE device associated with the new connection is connected to other PE devices in the VPLS system. In one implementation, pseudowire mechanism 410 may automatically determine whether the new connection is from a multi-homed CE device. For example, pseudowire mechanism 410 may query the CE device to determine whether the CE device is connected to other PE devices in the VPLS system. In another implementation, an administrator may enter information about whether the CE device is multi-homed into pseudowire table 415.

In response to determining that the new customer edge device connection is not a multi-homed connection (block 620—no), a single-homed pseudowire may be used (block 630). For example, if a VPLS packet arrives via the new connection, pseudowire mechanism 410 may add the same pseudowire label that is used for all other single-homed CE device connections to the PE device. If pseudowire table 415 does not include a pseudowire for single-homed devices, pseudowire mechanism 410 may create a single-homed pseudowire.

In response to determining that the new customer edge device connection is a multi-homed connection (block 620—yes), a new site number may be assigned (block 640) and a new pseudowire may be created (block 650). For example, pseudowire mechanism 410 may create assign a new site number to the CE device and may create a new pseudowire label that identifies the new CE device. If a frame arrives via the new connection, pseudowire mechanism 410 may add the new pseudowire label to the VPLS packet that will forward the frame through VPLS system 100.

Additionally, pseudowire mechanism 410 may indicate, in pseudowire table 415 that the new connection is to a site that is a neighbor of the PE device, meaning that the CE device is connected to, or directly reachable through, the PE device. This information may be required when flooding frames, so that a frame that originated from the CE device is not flooded back to the CE device, when a VPLS packet that includes the frame is received via another PE device.

Assume that a new multi-homed CE device was connected to a PE device and a new pseudowire was created for the new multi-homed CE devices. When a frame arrives from the newly connected multi-homed CE device, the PE device may create a VPLS packet that includes the frame, may add the new pseudowire label to the VPLS packet and, if the destination MAC address of the frame is known to the PE device, send the packet via a pseudowire through which the destination MAC address may be reached, and if the destination MAC address of the frame is not known, may flood the frame and the VPLS packet. In either case, when another PE device receives the VPLS packet, the PE device may not recognize the new pseudowire label.

In one implementation, the PE device may provide information about the new pseudowire to all other PE devices in the VPLS system by flooding the VPLS system. For example, the PE device may flood a control packet that includes the new pseudowire label, information identifying the CE device that is associated with the new pseudowire label, and an indication that the CE device is reachable through the PE device. In another implementation, the PE device may not initially provide information about the new pseudowire to other PE devices. In such an implementation, when another PE device receives a packet with the new pseudowire label, the PE device may need to query the PE device that sent the packet for information about the new pseudowire label, such as what site number is associated with the new pseudowire.

Figure 6B:
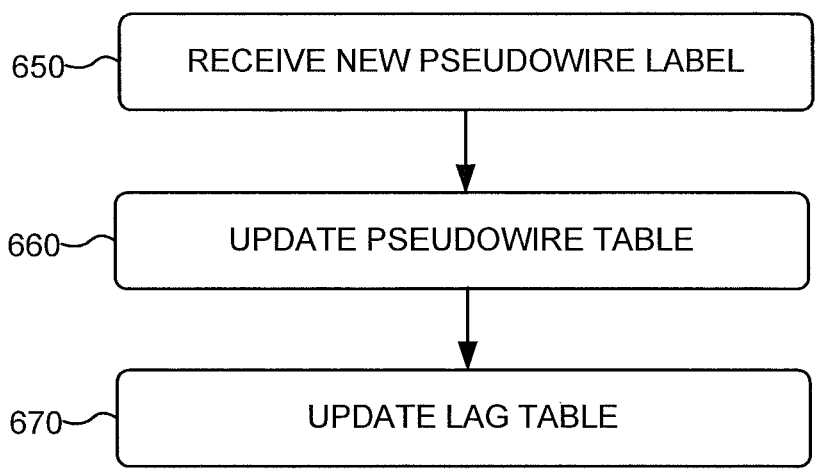
FIG. 6B is a flow chart illustrating a process of receiving a packet with a new pseudowire label according to an implementation described herein.

FIG. 6B is a flow chart illustrating a process of receiving a packet with a new pseudowire label according to an exemplary implementation. In one implementation, the process illustrated in FIG. 6B may be performed by one or more components of a particular PE device 110. In other implementations, the process illustrated in FIG. 6B may be performed by another device or group of devices separate from or including a particular PE device 110.

The process of FIG. 6B may include receiving a new pseudowire label (block 650). For example, pseudowire mechanism 410 may receive a control packet that includes a pseudowire label that may not be included in pseudowire table 415. A pseudowire table may be updated (block 660). For example, pseudowire mechanism 410 may add the received pseudowire label to pseudowire table 415, along with information about the CE device that is associated with the pseudowire label.

A link aggregation table may be updated (block 670). For example, pseudowire mechanism 410 may provide information to link aggregation mechanism 430 that the pseudowire label is associated with a pseudowire that may be used to reach the site associated with the new pseudowire. Link aggregation mechanism 430 may update link aggregation table 435 with the information.

Figure 7A:
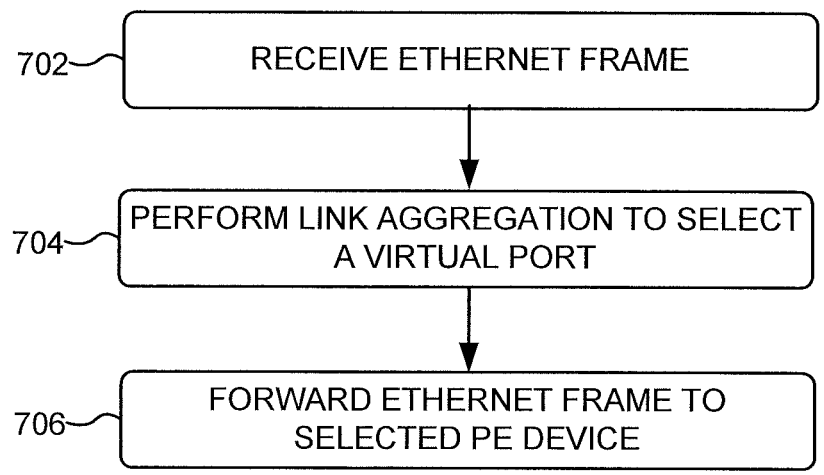
FIG. 7A is a flow chart illustrating a first process of processing a data frame according to an implementation described herein.

FIG. 7A is a flow chart illustrating a first process of processing an Ethernet frame according to an exemplary implementation. In one implementation, the process illustrated in FIG. 7A may be performed by one or more components of a particular CE device 120. In other implementations, the process illustrated in FIG. 7A may be performed by another device or a group of devices separate from or including a particular CE device 120.

The process of FIG. 7A may include receiving an Ethernet frame (block 702). For example, VPLS mechanism 411 may receive Ethernet frame 210 from a port associated with subnet 130. Link aggregation may be performed to select a virtual port (block 706). For example, link aggregation mechanism 431 may select a virtual port, associated with VPLS system 100, from a list of virtual ports, associated with PE devices to which CE device 120 is connected. As an example, in FIG. 1D, link aggregation mechanism 431 of CE device 120*a* may select either a virtual port associated with PE device 110*a* or virtual port associated with PE device 110*b* when sending an Ethernet frame from CE device 120*a* across VPLS system 100. An Ethernet frame may be forwarded to the selected PE device (block 708). For example, CE device 110 may forward Ethernet frame 210 via the selected virtual port.

Figure 7B:
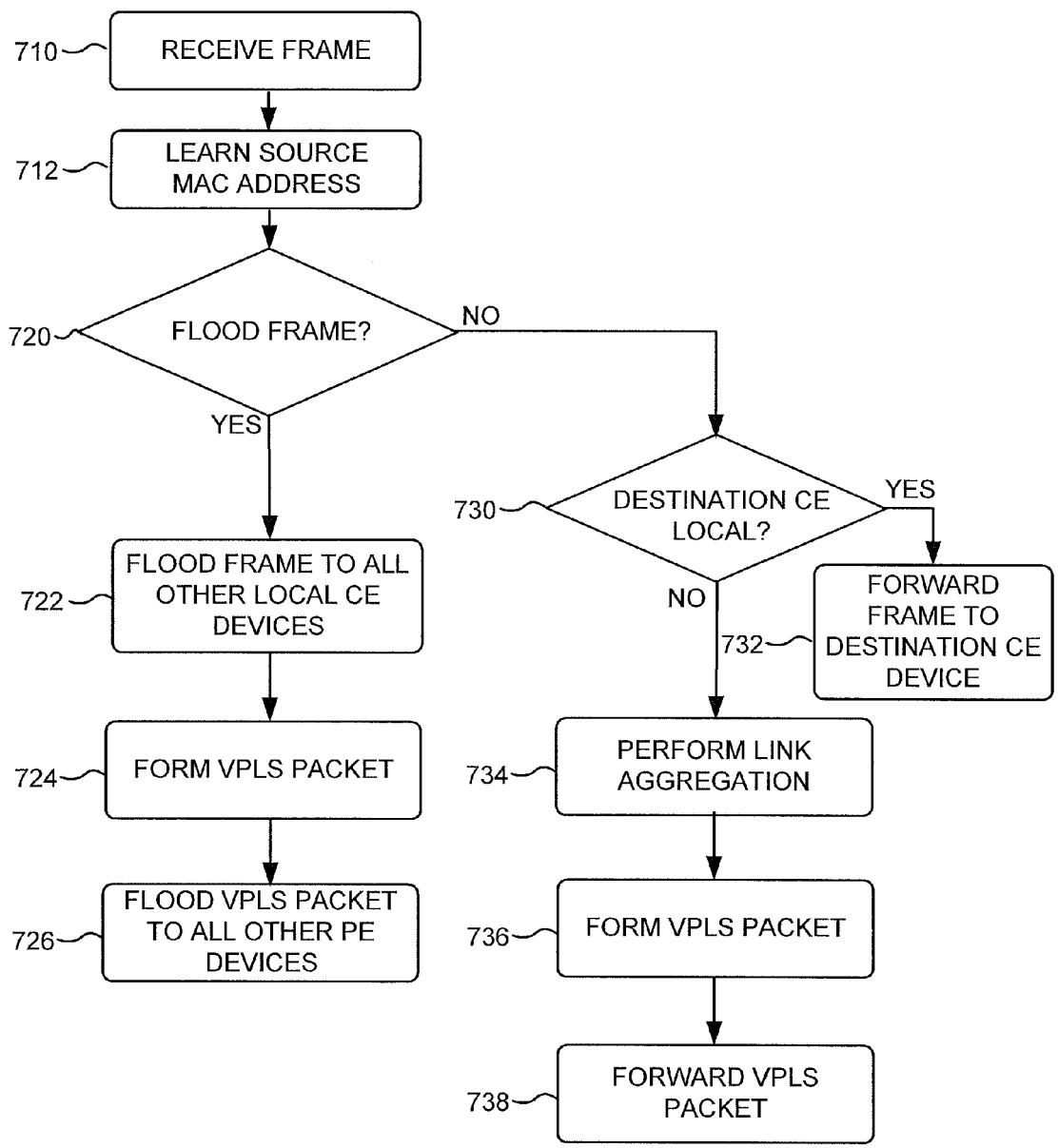
FIG. 7B is a flow chart illustrating a second process of processing a data frame according to an implementation described herein.
Figure 7C:
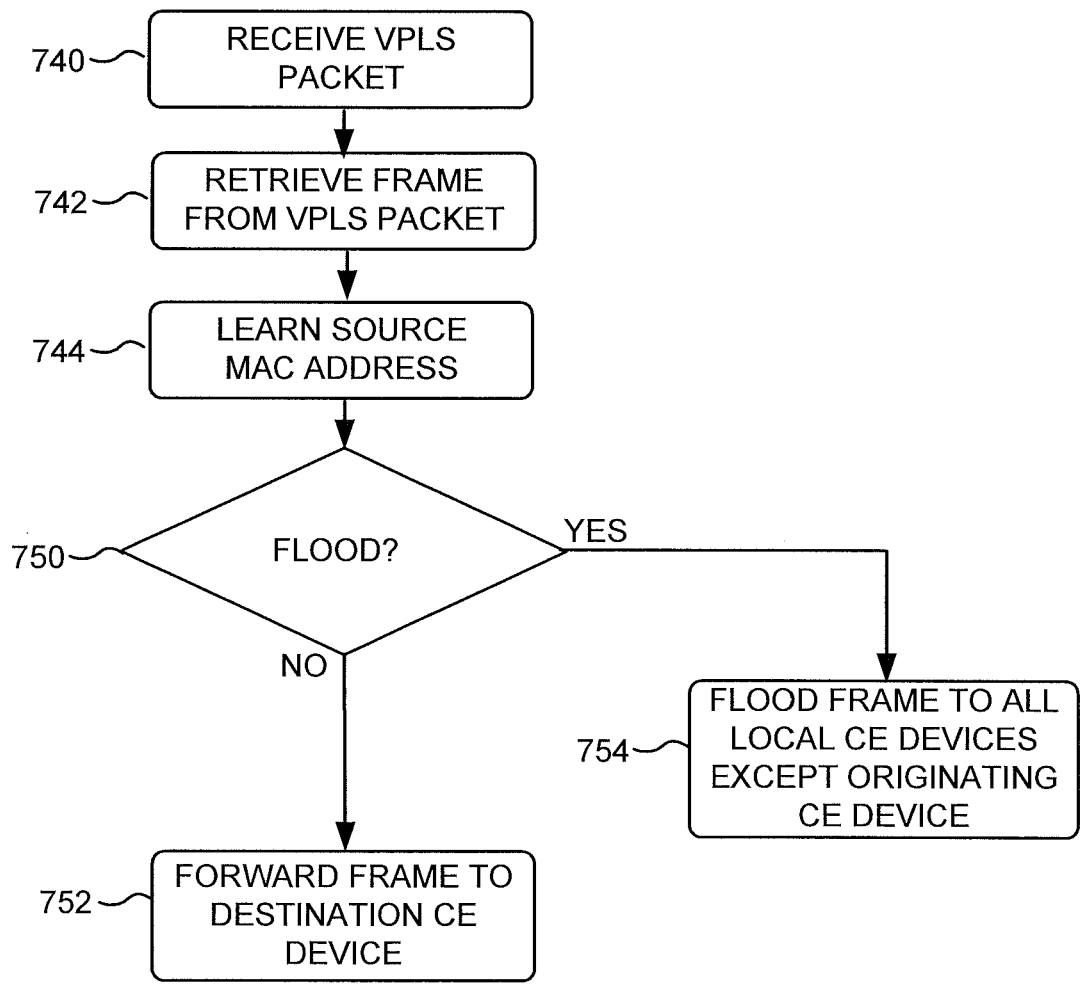
FIG. 7C is a flow chart illustrating a third process of processing a packet according to an implementation described herein.

The processes of FIGS. 7B and 7C illustrate exemplary routing of packets through VPLS system 100. VPLS system 100 may function on top of the existing routing topology of network 101. The existing routing topology of network 101 may change without any change in the routing topology of VPLS system 100. For example, in FIG. 1B, the particular route from PE device 110*a* to PE device 110*c* through network 101 may change without a functional change in pseudowire 125*a/c*. This may mean that when PE device 110*a* needs to send a packet to PE device 110*c* via pseudowire 125*a/c*, the particular egress port of PE device 110*a* through which the packet is sent may change. For example, one of network devices 150*a*-150*n* may go out of service, requiring PE device 110*a* to use a different port to send a VPLS packet to PE device 110*c*. Therefore, routing of packets through VPLS system 100 may be associated with particular source and destination CE devices and PE devices, rather than particular physical ports The process of FIG. 7B illustrates a process of receiving an Ethernet frame from CE device 120 at PE device 110, processing the Ethernet frame, and forwarding either the Ethernet frame, or the Ethernet frame encapsulated in a VPLS packet, to a destination (or to multiple destinations). In one implementation, the process illustrated in FIG. 7B may be performed by one or more components of a particular PE device 110. In other implementations, the process illustrated in FIG. 7B may be performed by another device, or a group of devices, separate from or including a particular PE device 110.

The process of FIG. 7B may include receiving an Ethernet frame (block 710). For example, PE device 110 may receive Ethernet frame 210 at one of its ports. A source MAC address may be learned from the packet (block 712). For example, PE device 110 may not have encountered source MAC address 214 of Ethernet frame 210, and may update MAC table 425 with source MAC address 214 and associated source MAC address 214 with the CE device from which Ethernet frame 210 was received.

A determination may be made as to whether to flood the frame (block 720). Flooding may refer to transmitting an Ethernet frame to all destinations in VPLS system 100 that are reachable from PE device 110. An Ethernet frame may be flooded if the Ethernet frame is a multicast or a broadcast frame, meaning that the frame should be sent to all destinations. In contrast, unicast frames may need to be sent to a specific destination. A unicast Ethernet frame 210 may need to be flooded if the destination MAC address 216 of Ethernet frame 210 is unknown to PE device 110 (i.e., if destination MAC address 216 is not in MAC table 425). For example, PE device 110 may have previously learned destination MAC address 216 and destination MAC address 216 may be in MAC table 425. Forwarding engine 420 may determine to flood Ethernet frame 210 if destination MAC address 216 is not in MAC table 425 or if packet 201 is a multicast or broadcast packet.

If the frame does not need to be flooded (block 720—no), a determination may be made as to whether the destination is local (block 730). For example, forwarding engine 420 may determine whether destination MAC address 216 of Ethernet frame 210 is associated with a site number or with a CE device in site number/CE device field 540 of MAC table 425. If destination MAC address 216 is associated is associated with a CE device, than a determination may be made that the destination is local. If destination MAC address 216 is associated with a site number, then a determination may be made that the destination is not local.

If it is determined that the destination is local (block 730—yes), the frame may be forwarded to a destination CE device (block 732). For example, forwarding engine 420 may forward Ethernet frame 210 to CE device 110 that is associated with destination MAC address 216 in MAC table 425.

If it is determined that the destination is not local (block 730—no), the frame may need to be encapsulated in a VPLS packet and sent to a remote PE device. Link aggregation may be performed (block 734). For example, forwarding engine 420 may provide a site number to link aggregation mechanism 430. Link aggregation mechanism 430 may consult LAG table 435 and select a particular pseudowire from a list of pseudowires through which the site number may be reached. Link aggregation mechanism 430 may provide the pseudowire to pseudowire mechanism 410.

A VPLS packet may be formed (block 734). For example, in one implementation, pseudowire mechanism 410 may add VPLS label 230 and pseudowire label 220 to Ethernet frame 210 to form VPLS packet 201. Pseudowire mechanism 410 may select pseudowire label 220 based on the pseudowire selected by link aggregation mechanism 430. In another implementation, pseudowire mechanism 410 may add a label that includes both a VPLS identifier and a pseudowire identifier. In yet another implementation, pseudowire mechanism 410 may add a label that includes a value that may be used to identify both VPLS system 100 and a particular pseudowire within VPLS system 100. The VPLS packet may be forwarded (block 738). For example, VPLS packet 201 may be provided to a port associated with the pseudowire identified in pseudowire label 220 of VPLS packet 201.

If the frame does need to be flooded (block 720—yes), the frame may be flooded to all other local CE devices (block 730). For example, flooding mechanism 440 may send Ethernet frame 210 to all other CE devices connected to the PE device. For example, in FIG. 1D, if PE device 110b receives an Ethernet frame from CE device 120a, and PE device 110b does not know the destination MAC address of the received Ethernet frame, or if the frame is a multicast or broadcast frame, PE device 110b will flood the frame to CE device 120b, CE device 120d, and CE device 120e.

Additionally, the frame may be flooded to all the PE devices 110 in VPLS system 110. Thus, a VPLS packet may be formed (block 724) and the VPLS packet may be flooded to all other PE devices (block 726). For example, flooding mechanism 440 may determine to send VPLS packet 201 to all sites that are not neighbors of PE device 110 and pseudowire mechanism 410 may add the appropriate pseudowire label for each pseudowire along which VPLS packet 201 is sent.

The process of FIG. 7C illustrates a process of receiving VPLS packet 201 at PE device 110 from a remote PE device 110, retrieving Ethernet frame 210, and forwarding Ethernet frame 210 to a destination CE device 120 (or to a group of CE devices). In one implementation, the process illustrated in FIG. 7C may be performed by one or more components of a particular PE device 110. In other implementations, the process illustrated in FIG. 7C may be performed by another device or a group of devices separate from or including a particular PE device 110.

The process of FIG. 7C may include receiving a VPLS packet (block 740). For example, PE device 110 may receive VPLS packet 201 at one of its ports associated with VPLS system 100. A frame may be retrieved from the VPLS packet (block 742). For example, pseudowire mechanism 410 may retrieve Ethernet frame 210 from VPLS packet 201. A source MAC address may be learned from the packet (block 712). For example, PE device 110 may not have encountered source MAC address 214 of Ethernet frame 210, and may update MAC table 425 with source MAC address 214 and associated source MAC address 214 with the site number from which Ethernet frame 210 was received. A determination may be made as to whether to flood the frame (block 720).

For example, PE device 110 may have previously learned destination MAC address 216 and destination MAC address 216 may be in MAC table 425. Forwarding engine 420 may determine to flood Ethernet frame 210 if destination MAC address 216 is not in MAC table 425 or if packet 201 is a multicast or broadcast packet.

If it is determined that the frame does not need to be flooded (block 750—no), the frame may be forwarded to a destination CE device (block 752). For example, forwarding engine 410 may determine that destination MAC address 216 of Ethernet frame 210 has an entry in MAC table 425 and may forward Ethernet frame 210 to CE device 120 associated with destination MAC address 216 in MAC table 425.

If it is determined that the frame needs to be flooded (block 750—yes), the frame may be flooded to all local CE devices except an originating CE device (block 754). For example, flooding mechanism 440 of PE device 110 may forward Ethernet frame 210 to all CE devices connected to PE device 110, except a CE device that originated Ethernet frame 110. In FIG. 1D, if PE device 110b receives a VPLS packet from PE device 110a, where the VPLS packet includes a frame from CE device 120a, PE device 110b may flood the frame to CE device 120b and CE device 120d, but may not flood the frame CE device 120a, which originated the frame. Determining whether a CE device originated a frame may be determined by consulting neighbor field 525 of pseudowire table 415. Thus, if a pseudowire label, from a received VPLS packet, is associated with a neighbor CE device, the Ethernet frame included in the received VPLS packet may not be flooded to the neighbor CE device.

Avoiding flooding to an originating CE device may be beneficial to avoiding loops. A loop may occur if a frame or a packet travels back to a device through which the packet already passed on its way to the packet's destination. In Ethernet networks, such as in subnet 130a, 130b, or 130c of FIG. 1A, loops may be avoided by using a spanning tree protocol (STP). A spanning tree may be a connected graph that connects all nodes of a network without loops, and a STP may compute such a graph for a particular network, thereby avoiding loops. STP may not be applicable to VPLS system 100 that includes multi-homed connections, because such a network may necessarily include loops in the connections. In VPLS system 100, a loop may exist from a CE device to a first PE device, from the first PE device to a second PE device, and from the second PE device back to the CE device. For example, in FIG. 1D, a loop may exist from CE device 120a to PE device 110a, from PE device 110a to PE device 110b, and from PE device 110b back to CE device 120a.

Figure 8:
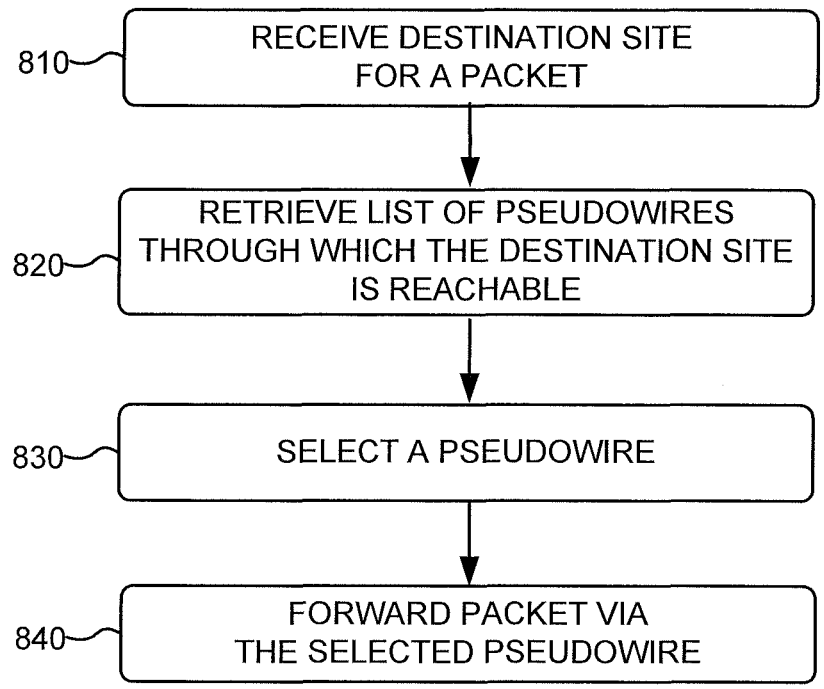
FIG. 8 is a flow chart illustrating a process of link aggregation according to an implementation described herein.

FIG. 8 is a flow chart illustrating a process of link aggregation according to an exemplary implementation. In one implementation, the process illustrated in FIG. 8 may be performed by one or more components of a particular PE device 110. In other implementations, the process illustrated in FIG. 8 may be performed by another device or a group of devices separate from or including a particular PE device 110.

The process of FIG. 8 may include receiving a destination site for a packet (block 810). For example, forwarding engine 420 may lookup MAC destination address 216 in MAC tables 425 and determine a site number associated with MAC destination address 216. For example, in FIG. 1A, VPLS packet 201 may arrive at PE device 110c from MAC address device 140*c*, and be destined for MAC address device 140*a*. Forwarding engine 420 of PE device 110*c* may determine from MAC table 425 that MAC address device 140*a* may be reached through site number one, which corresponds to multi-homed CE device 120*a*.

A list of pseudowires through which the destination site is reachable may be retrieved (block 820). For example, link aggregation mechanism 430 may access link aggregation table 435 to retrieve a list of pseudowires associated with the destination site. Continuing with the example above, link aggregation mechanism 430 of PE device 110*c* may access link aggregation table 435 to determine that site number one is reachable through pseudowire 125*c*/a and through pseudowire 125*c*/b (see FIG. 1B).

A pseudowire may be selected (block 830). For example, link aggregation mechanism 430 may perform a hash function to select one of the pseudowires through which the destination site may be reached. The hash function may be selected to assure that all pseudowires from the set of pseudowires to the destination site are selected equally frequently over time. The packet may be forwarded via the selected pseudowire (block 840). For example, PE device 110 may forward VPLS packet 201 vi a port associated with the selected pseudowire. Continuing the example from above, link aggregation mechanism 430 may select either pseudowire 125*c*/a or through pseudowire 125*c*/b. Assume pseudowire 125*c*/a is selected. PE device 110*c* may transmit VPLS packet 201 via a port associated with pseudowire 125*c*/a.

Figure 9:
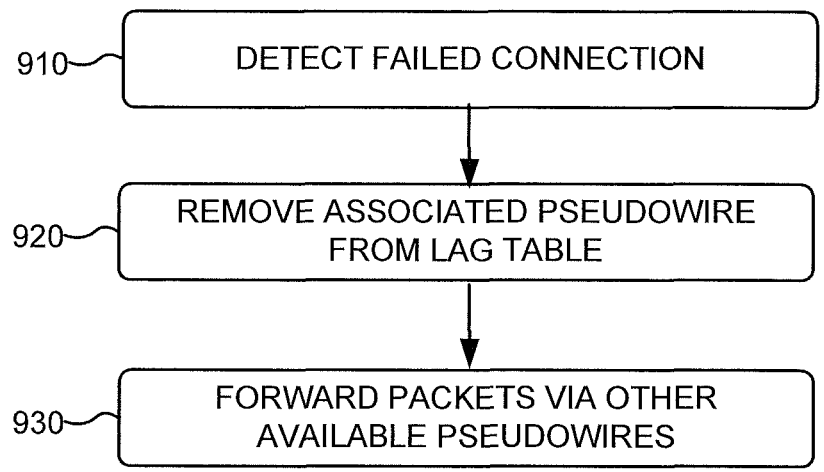
FIG. 9 is a flow chart illustrating a process of responding to a failed provider edge device according to an implementation described herein.

FIG. 9 is a flow chart illustrating a process of processing a failed connection to a PE device according to an exemplary implementation. In one implementation, the process illustrated in FIG. 9 may be performed by one or more components of a particular PE device 110. In other implementations, the process illustrated in FIG. 9 may be performed by another device or group of devices separate from or including a particular PE device 110.

The process of FIG. 9 may include detecting a failed connection (block 910). A connection which has failed may cause a CE device to be unreachable via a particular PE device. This may happen because a connection between a CE device and a PE device has failed, because a PE device has failed or is down for scheduled maintenance, or because one or more of a series of connections implementing a pseudowire has failed. A pseudowire may fail if no path from a first PE device to a second PE device can be found. For example, on or more network devices 150*a*-150*n* may fail, eliminating all possible routing paths between a first PE device and a second PE device. The most common cause of a failed connection may result from a failed connection between a CE device and a PE device. Assume that in FIG. 1B, the connection from CE device 120*a* to PE device 110*a* has failed. Thus, CE device 120*a* may not be reachable through PE device 110*a*.

An associated pseudowire may be removed from a link aggregation table (block 920). For example, link aggregation mechanism 430 may remove the associated pseudowire from link aggregation table 435. Continuing with the example given above, if the connection from CE device 120*a* to PE device 110*a* fails, pseudowire 125*c*/a may be removed from the entry of link aggregation table 435 of PE device 110*c* for site number one, leaving only pseudowire 125*c*/b associated with site number one. Thus, CE device 120*a* may now only be reachable through pseudowire 125*c*/b.

Packets may be forwarded via other available pseudowires (block 930). For example, link aggregation 430 may remove the pseudowire associated with the failed connection from the hash function. Continuing with the example given above, PE device 110*c* may send all packets destined for CE device 120*a* via pseudowire 125*c*/b.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while implementations described herein utilize a single pseudowire for all single-homed CE devices connected to a PE device, in other implementations, a PE device may generate a dedicated pseudowire for each single-homed CE device. For instance, in FIG. 1D, PE device 110*b* may send packets received from first single-homed device 120*b* along a first pseudowire and may send packets received from second single-homed device 120*d* along a second pseudowire. Such an implementation may increase processing requirements, but may allow a PE device to determine which CE device sent a packet for any packet.

As another example, while series of blocks have been described with respect to FIGS. 6A-6B, 7, 8, and 9, the order of the blocks may be modified in other implementations. Further, non-dependent blocks may be performed in parallel.

Still further, aspects have been mainly described in the context of a network element, such as a router, switch, gateway, or a firewall. As discussed above, the device and methods described herein may be used with any type of network device that communicates with other devices in a communications network.

Moreover, while certain devices are referred to herein as MAC address devices and certain addresses are referred to herein as MAC addresses, the description encompasses and applies equally to other types of devices and other types of addresses.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:

1. A system comprising:
a first edge device to:
receive a packet from a second edge device,
the packet including a data frame, and
the first edge device and the second edge device being connected to a multi-homed edge device;
determine that the packet is a multicast packet;
determine to flood the data frame based on the data frame being included in the packet and based on determining that the packet is the multicast packet;
determine, after determining to flood the data frame, that the data frame originated from a neighbor edge device based on information that indicates that the neighbor edge device is connected to the second edge device,
the neighbor edge device being the multi-homed edge device; and
transmit, based on determining that the data frame originated from the neighbor edge device, the data frame to one or more other edge devices that are connected to the first edge device and are not connected to the second edge device.

2. The system of claim 1,
where the first edge device is a first provider edge (PE) device, and
where the second edge device is a second PE device.

3. The system of claim 1, where the neighbor edge device is a customer edge (CE) device associated with a virtual private local area network service (VPLS) system.

4. The system of claim 1, where the first edge device is further to:
determine a source address that is included in the data frame, and
store, in an address table, the source address in association with information identifying the neighbor edge device.

5. The system of claim 1, where the first edge device is further to:
receive another data frame from the neighbor edge device,
incorporate the other data frame into another packet, and
transmit the other packet.

6. The system of claim 5, where the first edge device is further to:
determine that the neighbor edge device is the multi-homed edge device, and
incorporate a pseudowire label into the other packet based on the neighbor edge device being the multi-homed edge device.

7. The system of claim 1, where the first edge device is further to:
receive another data frame from a single-homed edge device,
incorporate the other data frame into another packet,
determine that the other data frame is from the single-homed edge device, and
incorporate a pseudowire label into the other packet based on the other data frame being from the single-homed edge device.

8. The system of claim 7, where the pseudowire label is different from one or more other pseudowire labels that are created for the multi-homed edge device and one or more other multi-homed edge devices.

9. A non-transitory computer-readable medium storing instructions, the instructions comprising:
one or more instructions that, when executed by a first edge device, cause the first edge device to:
receive a frame from a second edge device,
the first edge device and the second edge device being connected to a multi-homed edge device;
determine a destination address associated with the frame;
determine that the destination address is not included in a particular storage component;
determine to flood the frame based on the destination address not being included in the particular storage component;
determine, after determining to flood the frame, that the frame originated from a neighbor edge device based on information that indicates that the neighbor edge device is connected to the second edge device,
the neighbor edge device being the multi-homed edge device; and
transmit, based on determining that the frame originated from the neighbor edge device, the frame to one or more other edge devices that are connected to the first edge device and are not connected to the second edge device.

10. The non-transitory computer-readable medium of claim 9,
where the first edge device and the second edge device are provider edge (PE) devices, and
where the neighbor edge device and the one or more other edge devices are customer edge (CE) devices.

11. The non-transitory computer-readable medium of claim 9, where the one or more instructions to receive the frame include:
one or more instructions that, when executed by the first edge device, cause the at least one processor to:
receive a virtual private local area network service (VPLS) packet from the second edge device,
the first edge device, the second edge device, the neighbor edge device, and the one or more other edge devices being customer edge (CE) devices associated with a VPLS system, and
retrieve the frame from the VPLS packet.

12. The non-transitory computer-readable medium of claim 9, where the instructions further comprise:
one or more instructions that, when executed by the first edge device, cause the at least one processor to:
determine a source address that is included in the frame,
determine a site number associated with the source address, and
store the source address in association with information identifying one or more of the neighbor edge device or the site number.

13. The non-transitory computer-readable medium of claim 9, where the instructions further comprise:
one or more instructions that, when executed by the first edge device, cause the first edge device to:
receive a different frame;
determine that the different frame is included in a multicast packet, and
flood the different frame based on the different frame being included in the multicast packet.

14. The non-transitory computer-readable medium of claim 9, where the instructions further comprise:
one or more instructions that, when executed by the first edge device, cause the first edge device to:
receive another frame,
determine that the other frame does not need to be flooded,
determine a destination address associated with the other frame, and forward the other frame only to a particular edge device, of the one or more other edge devices, that is identified by the destination address.

15. A method comprising:

receiving, by a first edge device, a data frame from a second edge device,
the first edge device and the second edge device being connected to a multi-homed edge device;

determining, by the first edge device, a pseudowire label associated with the data frame;

determining, by the first edge device, that the data frame originated from a multi-homed edge device based on the pseudowire label;

determining, by the first edge device, that the data frame originated from a neighbor edge device based on information that indicates that the neighbor edge device is the multi-homed edge device connected to the second edge device; and transmitting, based on determining that the data frame originated from the neighbor edge device, the data frame to one or more other edge devices that are connected to the first edge device and are not connected to the second edge device.

16. The method of claim 15,
where the first edge device and the second edge device are provider edge (PE) devices, and
where the neighbor edge device is a customer edge (CE) device.

17. The method of claim 15,
where the information that indicates that the neighbor edge device is connected to the second edge device is included in a neighbor field of a pseudowire table stored by the first edge device, and
where determining that the data frame originated from the neighbor edge device includes:
determining that the data frame originated from the neighbor edge device based on the neighbor field of the pseudowire table.

18. The method of claim 15, further comprising:
receiving another data frame from the neighbor edge device;
determining that the neighbor edge device is the multi-homed edge device;
creating a packet based the other data frame and a pseudowire label that is associated with the multi-homed edge device; and
sending the packet to the second edge device.

19. The method of claim 15, further comprising:
receiving a different data frame from the neighbor edge device;
incorporating the different data frame into a different packet;
incorporating a pseudowire label into the different packet based on the neighbor edge device being the multi-homed edge device; and
transmitting the different packet.

20. The method of claim 15, further comprising:
determining that the data frame is included in a multicast packet, and
determining, before determining that the data frame originated from the neighbor edge device, to flood the data frame based on the data frame being included in the multicast packet.

* * * * *